(12) United States Patent
Gallegos-Lopez et al.

(10) Patent No.: US 8,115,430 B2
(45) Date of Patent: Feb. 14, 2012

(54) METHODS, SYSTEMS AND APPARATUS FOR CONTROLLING OPERATION OF TWO ALTERNATING CURRENT (AC) MACHINES

(75) Inventors: Gabriel Gallegos-Lopez, Torrance, CA (US); James M. Nagashima, Cerritos, CA (US); Milun Perisic, Torrance, CA (US); Silva Hiti, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 401 days.

(21) Appl. No.: 12/473,964

(22) Filed: May 28, 2009

(65) Prior Publication Data
US 2010/0301786 A1   Dec. 2, 2010

(51) Int. Cl.
*H02P 21/00* (2006.01)
*H02P 27/00* (2006.01)

(52) U.S. Cl. ............... 318/400.02; 318/400.3; 318/807; 318/812; 180/65.285; 323/282; 363/97; 363/123

(58) Field of Classification Search ............. 318/400.02, 318/400.3, 812, 807; 180/65.285; 323/282; 363/97, 123
See application file for complete search history.

(56) References Cited

U.S. PATENT DOCUMENTS

| | | | | |
|---|---|---|---|---|
| 7,221,121 | B2 * | 5/2007 | Skaug et al. | 318/807 |
| 7,728,562 | B2 * | 6/2010 | Kajouke et al. | 323/222 |
| 2005/0068001 | A1 * | 3/2005 | Skaug et al. | 318/807 |
| 2007/0247123 | A1 * | 10/2007 | Bocchiola | 323/222 |
| 2009/0027933 | A1 * | 1/2009 | Kajouke et al. | 363/97 |
| 2010/0202177 | A1 * | 8/2010 | Kajouke et al. | 363/131 |

OTHER PUBLICATIONS

Clarke & Park Transforms on the TMS320C2xx. Application Report Literature No. BPRA048, 1997, Texas Instruments Incorporated.
Dujic, D. et al., "Features of two Multi-Motor Drive Schemes Supplied from Five-Phase/Five-Leg Voltage Source Inverters," Liverpool John Moores University, School of Engineering, Liverpool, UK. Obtained on.
Gallegos-Lopez, G. et al., "Optimum Current Control in the Field-Weakened Region for Permanent Magnet AC Machines," IEEE Industry Applications Conference, 2007, Sep. 2007, pp. 2154-2160.

* cited by examiner

*Primary Examiner* — Paul Ip
(74) *Attorney, Agent, or Firm* — Ingrassia Fisher & Lorenz P.C.

(57) ABSTRACT

A system is provided for controlling two AC machines. The system comprises a DC input voltage source that provides a DC input voltage, a voltage boost command control module (VBCCM), a five-phase PWM inverter module coupled to the two AC machines, and a boost converter coupled to the inverter module and the DC input voltage source. The boost converter is designed to supply a new DC input voltage to the inverter module having a value that is greater than or equal to a value of the DC input voltage. The VBCCM generates a boost command signal (BCS) based on modulation indexes from the two AC machines. The BCS controls the boost converter such that the boost converter generates the new DC input voltage in response to the BCS. When the two AC machines require additional voltage that exceeds the DC input voltage required to meet a combined target mechanical power required by the two AC machines, the BCS controls the boost converter to drive the new DC input voltage generated by the boost converter to a value greater than the DC input voltage.

20 Claims, 13 Drawing Sheets

… (1)

METHODS, SYSTEMS AND APPARATUS FOR CONTROLLING OPERATION OF TWO ALTERNATING CURRENT (AC) MACHINES

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of contract number DE-FC26-07NT43123 awarded by the United States Department of Energy.

TECHNICAL FIELD

The present invention generally relates to hybrid and electric vehicle power systems, and more particularly relates to controlling operation of two AC machines that are part of a hybrid and electric vehicle power system and that are controlled by a single five-phase PWM inverter module.

BACKGROUND OF THE INVENTION

Hybrid and electric vehicles (HEVs) typically include an alternating current (AC) electric motor which is driven by a power converter with a direct current (DC) power source, such as a storage battery. Motor windings of the AC electric motor can be coupled to power inverter module(s) which perform a rapid switching function to convert the DC power to AC power which drives the AC electric motor, which in turn drives a shaft of HEV's drivetrain. Traditional HEVs implement two three-phase pulse width modulated (PWM) inverter modules and two three-phase AC machines (e.g., AC motors) each being driven by a corresponding one of the three-phase PWM inverter modules that it is coupled to.

Recently, researchers have investigated the possibility of replacing the two three-phase pulse width modulated inverter modules with a single five-phase PWM inverter module that simultaneously drives both of the three-phase AC machines. In addition, researchers have also investigated the possibility of using a single five-phase PWM inverter module that drives a first five-phase AC machine that is coupled to a second five-phase AC machine. One example of such research is described in a publication titled "Features of two Multi-Motor Drive Schemes Supplied from Five-Phase/Five-Leg Voltage Source Inverters," by Dujić et al., May 27, 2008, which is incorporated by reference herein in its entirety.

While the possibility of using such inverter and motor configurations in HEVs is being explored, a lot of work remains to be done before these inverter and motor configurations can actually be implemented. One problem that has yet to be addressed is how to maintain the required output mechanical power of each machine while meeting voltage sharing constraints.

Accordingly, it is desirable to provide methods, systems and apparatus controlling operation of two AC machines that are controlled by a single five-phase PWM inverter module that allow constant output power with voltage constraint i.e. in the field-weakening region. It would also be desirable to provide methods, systems and apparatus for increasing the voltage used to drive the two AC machines. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Embodiments of the present invention relate to apparatus for it is controlling operation of two AC machines that are controlled by a single five-phase PWM inverter module.

In accordance with one embodiment, a system is provided for controlling two alternating current (AC) machines. The system comprises a DC input voltage source that provides a DC input voltage, a voltage boost command control module (VBCCM), a five-phase PWM inverter module coupled to the two AC machines, and a boost converter coupled to the inverter module and the DC input voltage source. The boost converter is designed to supply a new DC input voltage to the inverter module having a value that is greater than or equal to a value of the DC input voltage. The VBCCM generates a boost command signal that controls the boost converter such that the boost converter generates the new DC input voltage in response to the boost command signal. When the two AC machines require additional voltage that exceeds the DC input voltage required to meet a combined target mechanical power required by the two AC machines, the boost command signal controls the boost converter to drive the new DC input voltage generated by the boost converter to a value greater than the DC input voltage.

For example, in one implementation, the voltage VBCCM can provide a boost command signal with a value equal to zero when the two AC machines require voltage that is less than or equal to the DC input voltage, and in this case the new DC input voltage will be equal to original DC input voltage. However, when the two AC machines require additional voltage to meet their target mechanical power that exceeds the DC input voltage, the voltage boost command signal has a value greater than zero and the new DC input voltage is regulated to a voltage higher than the original DC input voltage.

In one implementation, the system comprises a first control loop that generates a first modulation index, and a second control loop that generates a second modulation index. VBCCM receives a modulation index reference signal, the first modulation index from the first control loop and the second modulation index from the second control loop, and adds the first modulation index to the second modulation index to generate a modulation index feedback signal input, and then subtracts the modulation index feedback signal input from the modulation index reference signal input to generate a modulation index error signal. Based on the modulation index error signal, the boost command signal is calculated.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1A:
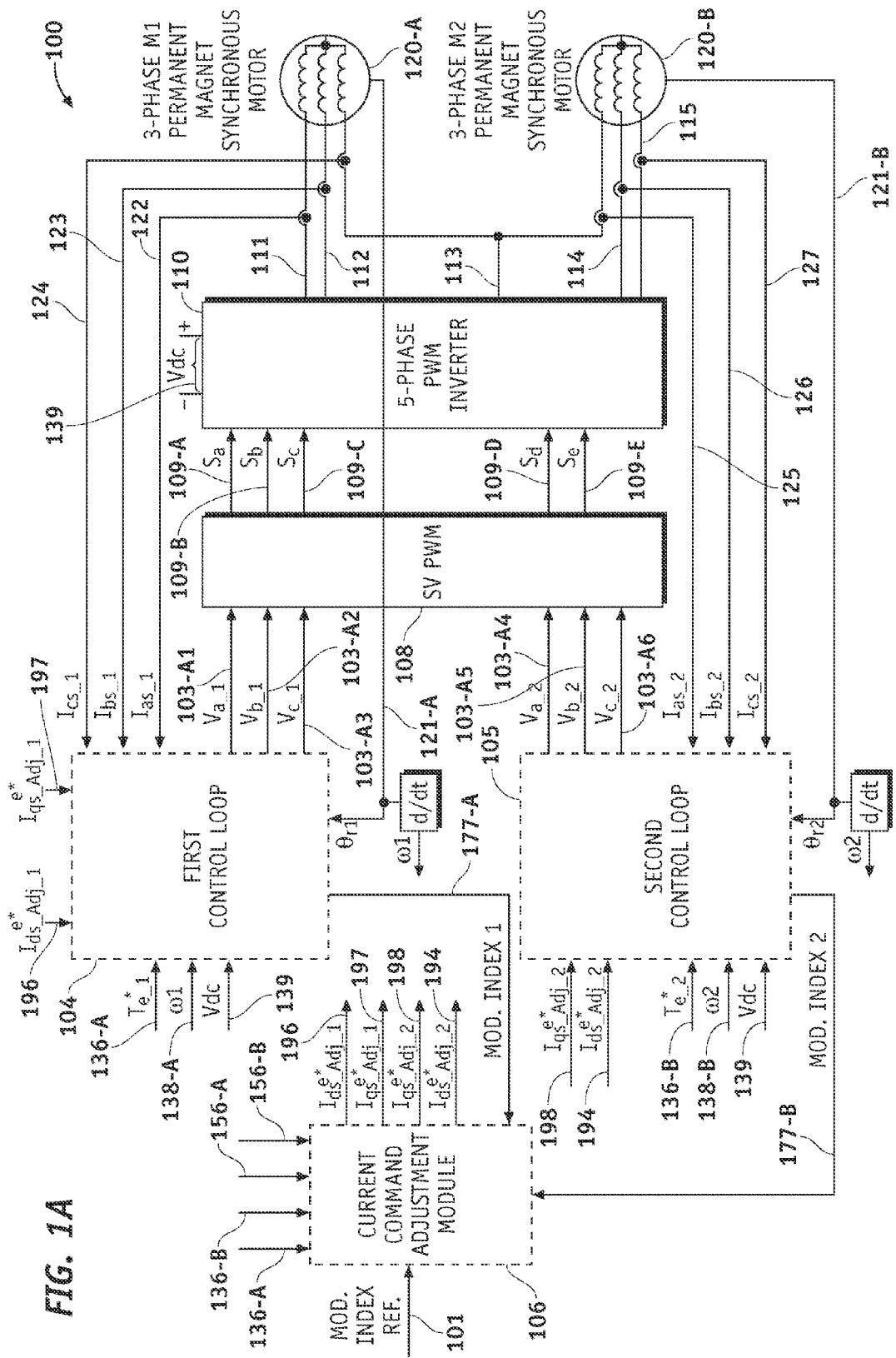
FIGS. 1A-D illustrate block diagrams of a torque control system 100 architecture implemented in motor drive system of a hybrid/electric vehicle (HEV) according to one exemplary implementation of the present invention.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to controlling operation of two AC machines that are controlled by a single five-phase PWM inverter module. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for controlling operation of two AC machines, as described herein. As such, these functions may be interpreted as steps of a method for controlling operation of two AC machines that are controlled by a single five-phase PWM inverter module. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods and apparatus for controlling operation of two AC machines that are controlled by a single five-phase PWM inverter module. The disclosed methods and apparatus can be implemented in operating environments where it is necessary to controlling operation of two AC machines that are controlled by a single five-phase PWM inverter module in a hybrid/electric vehicle (HEV). In the exemplary implementations which will now be described, the control techniques and technologies will be described as applied to a hybrid/electric vehicle (HEV). However, it will be appreciated by those skilled in the art that the same or similar techniques and technologies can be applied in the context of other systems which it is necessary to control operation of two AC machines. In this regard, any of the concepts disclosed here can be applied generally to "vehicles," and as used herein, the term "vehicle" broadly refers to a non-living transport mechanism having an AC motor. Examples of such vehicles include automobiles such as buses, cars, trucks, sport utility vehicles, vans, vehicles that do not travel on land such as mechanical water vehicles including watercraft, hovercraft, sailcraft, boats and ships, mechanical under water vehicles including submarines, mechanical air vehicles including aircraft and spacecraft, mechanical rail vehicles such as trains, trams and trolleys, etc. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

EXEMPLARY IMPLEMENTATIONS

FIGS. 1A-D illustrate block diagrams of a torque control system 100 architecture implemented in motor drive system of a hybrid/electric vehicle (HEV) according to one exemplary implementation of the present invention. In this embodiment, the system 100 can be used to control two three-phase AC machines 120 via a five-phase pulse width modulated (PWM) inverter module 110 connected to the two three-phase AC machines 120 so that the two three-phase AC machines 120 share a DC input voltage (Vdc) 139 available from the five-phase PWM inverter module 110 by adjusting current commands that control the two three-phase AC machines 120. The AC machines are illustrated as being permanent magnet synchronous AC motors; however, it should be appreciated that the illustrated embodiment is only one non-limiting example of the types of AC machines that the disclosed embodiments can be applied to and that the disclosed embodiments can be applied to any type of AC machine. Here the term "AC machine" generally refers to "a device or apparatus that converts electrical energy to mechanical energy or vice versa." AC machines can generally be classified into synchronous AC machines and asynchronous AC machines. Synchronous AC machines can include permanent magnet machines and reluctance machines. Permanent magnet machines include surface mount permanent magnet machines (SMPMMs) and interior permanent magnet machines (IPMMs). Asynchronous AC machines include induction machines. Although an AC machine can be an AC motor (i.e., apparatus used to convert AC electrical energy power at its input to produce to mechanical energy or power), an AC machine is not limited to being an AC motor, but can also encompass AC generators that are used to convert mechanical energy or power at its prime mover into electrical AC energy or power at its output. Any of the machines can be an AC motor or an AC generator. An AC motor is an electric motor that is driven by an alternating current (AC). An AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous. A synchronous AC motor rotates exactly at the supply frequency or a sub-multiple of the supply frequency. The magnetic field on the rotor is either generated by current delivered through slip rings or by a permanent magnet. In implementations where the AC machine is a permanent magnet synchronous AC motor this should be understood to encompass Interior Permanent Magnet motors. By contrast, an asynchronous (or induction) AC motor turns slightly slower than the supply frequency. The magnetic field on the rotor of this motor is created by an induced current.

As illustrated in FIG. 1A, the system 100 comprises a first control loop 104, a second control loop 105, a Space Vector (SV) PWM module 108, the five-phase PWM inverter module 110, a first three-phase AC machine 120-A coupled to the five-phase PWM inverter module 110, a second three-phase AC machine 120-B coupled to the five-phase PWM inverter module 110, and a current command adjustment module 106 coupled to the first control loop 104 and the second control loop 105. In one non-limiting implementation, the three-phase AC machines can be three-phase AC powered motors.

Space Vector (SV) modulation is coupled to first control loop 104 and the second control loop 105 and is used for the control of pulse width modulation (PWM). In general, the SVPWM module 108 receives voltage command signals 103 and generates switching vector signals 109 which it provides to the five-phase PWM inverter module 110. In particular, the SVPWM module 108 receives a first sinusoidal voltage command (Va_1) 103-A1, a second sinusoidal voltage command (Vb_1) 103-A2, a third sinusoidal voltage command (Vc_1) 103-A3, a fourth sinusoidal voltage command (Va_2) 103-A4, a fifth sinusoidal voltage command (Vb_2) 103-A5, a sixth sinusoidal voltage command (Vc_2) 103-A6, and uses these inputs to generate a first switching vector signal (Sa) 109-A, a second switching vector signal (Sb) 109-B, a third switching vector signal (Sc) 109-C, a fourth switching vector signal (Sd) 109-D, and a fifth switching vector signal (Se) 109-E. The particular SV modulation algorithm implemented in the first SV PWM module 108-A can be any known SV modulation algorithm. The switching vectors can be generated using modulation signals from Equation (4) from Dujic's paper (referenced above) and comparing it with a carrier signal.

The five-phase PWM inverter module 110 is coupled to the Space Vector (SV) PWM module 108 and uses the switching vector signals 109 to generate sinusoidal voltage signals at inverter poles 111-115. In the particular embodiment, the five-phase PWM inverter module 110 receives the first switching vector signal (Sa) 109-A, the second switching vector signal (Sb) 109-B, the third switching vector signal (Sc) 109-C, the fourth switching vector signal (Sd) 109-D, and the fifth switching vector signal (Se) 109-E. The five-phase PWM inverter module 110 includes a plurality of inverter poles including a first inverter pole 111 that generates a first sinusoidal voltage (Va_*), a second inverter pole 112 that generates a second sinusoidal voltage (Vb_*), a third inverter pole 113 that generates a third sinusoidal voltage (Vc_*), a fourth inverter pole 114 that generates a fourth sinusoidal voltage (Vd_*), and a fifth inverter pole 115 that generates a fifth sinusoidal voltage (Ve_*).

The first three-phase AC machine 120-A is coupled to the five-phase PWM inverter module 110 via the first inverter pole 111, the second inverter pole 112 and the third inverter pole 113. The first three-phase AC machine 120-A generates mechanical power (Torque×Speed) and a first shaft position output ($\theta\_r1$) based on the first sinusoidal voltage (Va_*), the second sinusoidal voltage (Vb_*) and the third sinusoidal voltage (Vc_*). In one implementation, the first shaft position output ($\theta\_r1$) can be measured via a position sensor (not illustrated) that measures that angular position of the rotor of the first three-phase AC machine 120-A.

The second three-phase AC machine 120-B is coupled to the five-phase PWM inverter module 110 via the third inverter pole 113, the fourth inverter pole 114 and the fifth inverter pole 115. In other words, the second three-phase AC machine 120-B and the first three-phase AC machine 120-A share the third inverter pole 113. The second three-phase AC machine 120-B generates mechanical power (Torque×Speed) and a second shaft position output ($\theta\_r2$) based on the third sinusoidal voltage (Vc_*), the fourth sinusoidal voltage (Vd_*) and the fifth sinusoidal voltage (Ve_*).

As will be explained in greater detail below, the current command adjustment module 106 receives d-axis current command signals 156, and modulation index signals 177-A, 177-B, from the first control loop 104 and the second control loop 105, respectively, and torque command signals 136A, B and modulation index reference signal 101 and generates adjusted d-axis and adjusted q-axis current command signals 194, 196-198 based on these signals. Prior to describing the operation of the current command adjustment module 106, operation of the first control loop 104 and the second control loop 105 will be described.

Figure 1B:
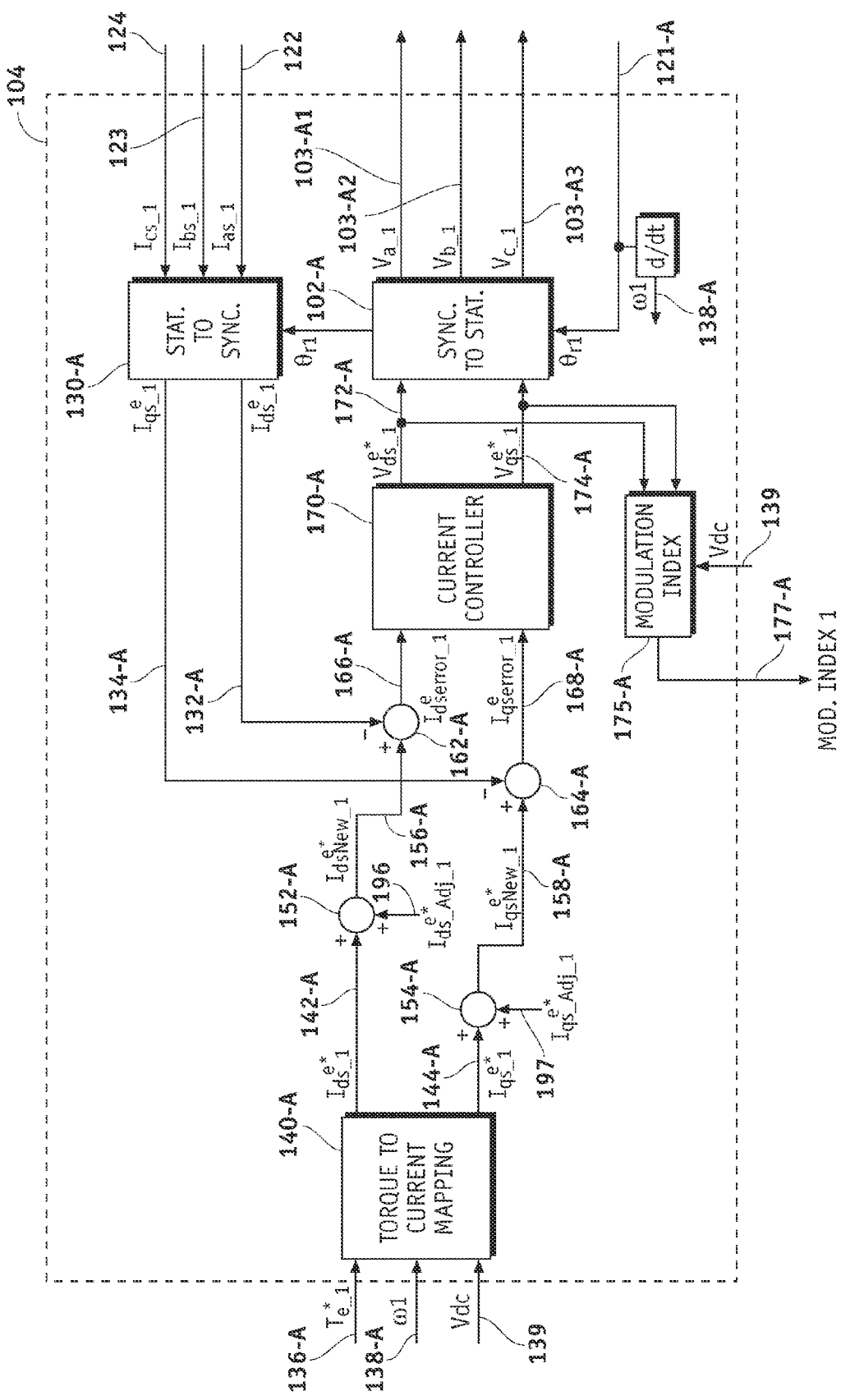

As illustrated in FIG. 1B, the first control loop 104 includes a first stationary-to-synchronous conversion module 130-A, a first torque-to-current mapping module 140-A, a second summing junction 152-A, a third summing junction 162-A, a fourth summing junction 154-A, a fifth summing junction 164-A, a first current controller module 170-A, a first modulation index computation module 175-A, and a first synchronous-to-stationary conversion module 102-A. Operation of the first control loop 104 will now be described.

The first stationary-to-synchronous conversion module 130-A receives a first resultant stator current (Ias_1) 122, a second resultant stator current (Ibs_1) 123, and a third resultant stator current (Ics_1) 124 that are measured phase currents from motor 120-A, as well as the first shaft position output ($\theta\_r1$) 121-A. The first stationary-to-synchronous conversion module 130-A can process or convert these stator currents 122-124 along with the first shaft position output ($\theta\_r1$) 121-A to generate a first feedback d-axis current signal (Ids_e_1) 132-A and a first feedback q-axis current signal (Iqs_e_1) 134-A. The process of stationary-to-synchronous conversion can be performed using Clarke and Park Transformations that are well-known in the art and for sake of brevity will not be described in detail. One implementation of the Clarke and Park Transformations is described in "Clarke & Park Transforms on the TMS320C2xx," Application Report Literature Number: BPRA048, Texas Instruments, 2007, which is incorporated by reference herein in its entirety.

The first torque-to-current mapping module 140-A receives a first torque command signal (Te*_1) 136-A that is input from a user of the system 100, a first speed ($\omega$1) 138-A of the shaft that is calculated based on the derivative of the first shaft position output ($\theta\_r1$), and the DC input voltage (Vdc) 139 as inputs. The first torque-to-current mapping module 140-A uses the inputs to map the first torque command signal (Te*_1) 136-A to a first d-axis current command signal (Ids_e*_1) 142-A and a first q-axis current command signal (Iqs_e*_1) 144-A. The mapping can be calculated using motor parameters and the following equation.

$$T = \frac{3}{2} \cdot \frac{P}{2} \cdot [k_e \cdot I_{qs} - (L_q - L_d) \cdot I_{qs} \cdot I_{ds}]$$

for $I_{ph} \leq I_{max}$ and $V_{ds}=r_s \cdot I_{ds}-\omega_e \cdot L_q \cdot I_{qs}$, $V_{qs}=r_s \cdot I_{qs}+\omega_e \cdot (L_d \cdot I_{ds}+k_e)$ for $V_{ph} \leq K \cdot V_{max}$, where $I_{ph}=\sqrt{I_{ds}^2+I_{qs}^2}$, and $V_{ph}=\sqrt{V_{ds}^2+V_{qs}^2}$ the Ids and Iqs currents are calculated such that torque per ampere is maximized.

Upon receiving the first d-axis current command signal (Ids_e*_1) 142-A and an adjusted d-axis current command signal (Ids_e*_Adj_1) 196 (from the current command adjustment module 106), the second summing junction 152-A adds the first d-axis current command signal (Ids_e*_1) 142-A to an adjusted d-axis current command signal (Ids_e*_Adj_1) 196 to generate a first new d-axis current command signal (IdsNew_e*_1) 156-A. Upon receiving the first new d-axis current command signal (IdsNew_e*_1) 156-A and a first feedback d-axis current signal (Ids_e_1) 132-A from the first stationary-to-synchronous conversion module 130-A, the third summing junction 162-A subtracts the first feedback d-axis current signal (Ids_e_1) 132-A from the first new d-axis current command signal (IdsNew_e*_1) 156-A to generate a first error d-axis current signal (Idserror_e_1) 166-A.

Similarly, upon receiving the first q-axis current command signal (Iqs_e*_1) 144-A and a first adjusted q-axis current command signal (Iqs_e*_Adj_1) 197 (from the current command adjustment module 106), the fourth summing junction 154-A adds the first q-axis current command signal (Iqs_e*_1) 144-A to the first adjusted q-axis current command signal (Iqs_e*_Adj_1) 197 to generate a first new q-axis current command signal (IqsNew_e*_1) 158-A. The fifth summing junction 164-A then receives the first new q-axis current command signal (IqsNew_e*_1) 158-A and a first feedback q-axis current signal (Iqs_e_1) 134-A from the first stationary-to-synchronous conversion module 130-A, and subtracts the first feedback q-axis current signal (Iqs_e_1) 134-A from the first new q-axis current command signal (IqsNew_e*_1) 158-A to generate a first error q-axis current signal (Iqserror_e_1) 168-A.

The first current controller module 170-A receives the first error d-axis current signal (Idserror_e_1) 166-A and the first error q-axis current signal (Iqserror_e_1) 168-A and uses these signals to generate a first d-axis voltage command signal (Vds_e*_1) 172-A and a first q-axis voltage command signal (Vqs_e*_1) 174-A that are used to control or regulate current. The process of current to voltage conversion can be implemented as a Proportional-Integral (PI) controller, which is well-known in the art and for sake of brevity will not be described in detail.

The first modulation index computation module 175-A receives the first d-axis voltage command signal (Vds_e*_1) 172-A and the first q-axis voltage command signal (Vqs_e*_1) 174-A, and uses these signals to generate a first modulation index (Mod. Index 1) 177-A. As used herein, "modulation index (MI)" can be defined via the equation $$MI = \frac{V_{ph}}{V_{dc}} \cdot \frac{\pi}{2},$$

where $V_{ph}=\sqrt{V_{ds}^2+V_{qs}^2}$, and Vds and Vqs are the first d-axis voltage command signal (Vds_e*_1) 172-A and the first q-axis voltage command signal (Vqs_e*_1) 174-A output by current controller 170. The range of modulation index is from 0 to 1.

The first synchronous-to-stationary conversion module 102-A receives the first d-axis voltage command signal (Vds_e*_1) 172-A and the first q-axis voltage command signal (Vqs_e*_1) 174-A, and based on these signals, generates a first sinusoidal voltage command (Va_1) 103-A1, a second sinusoidal voltage command (Vb_1) 103-A2, and a third sinusoidal voltage command (Vc_1) 103-A3. The process of synchronous-to-stationary conversion is done using inverse Clarke and Park Transformations that are well-known in the art and for sake of brevity will not be described in detail. One implementation of the inverse Clarke and Park Transformations is described in the above referenced document "Clarke & Park Transforms on the TMS320C2xx."

Figure 1C:
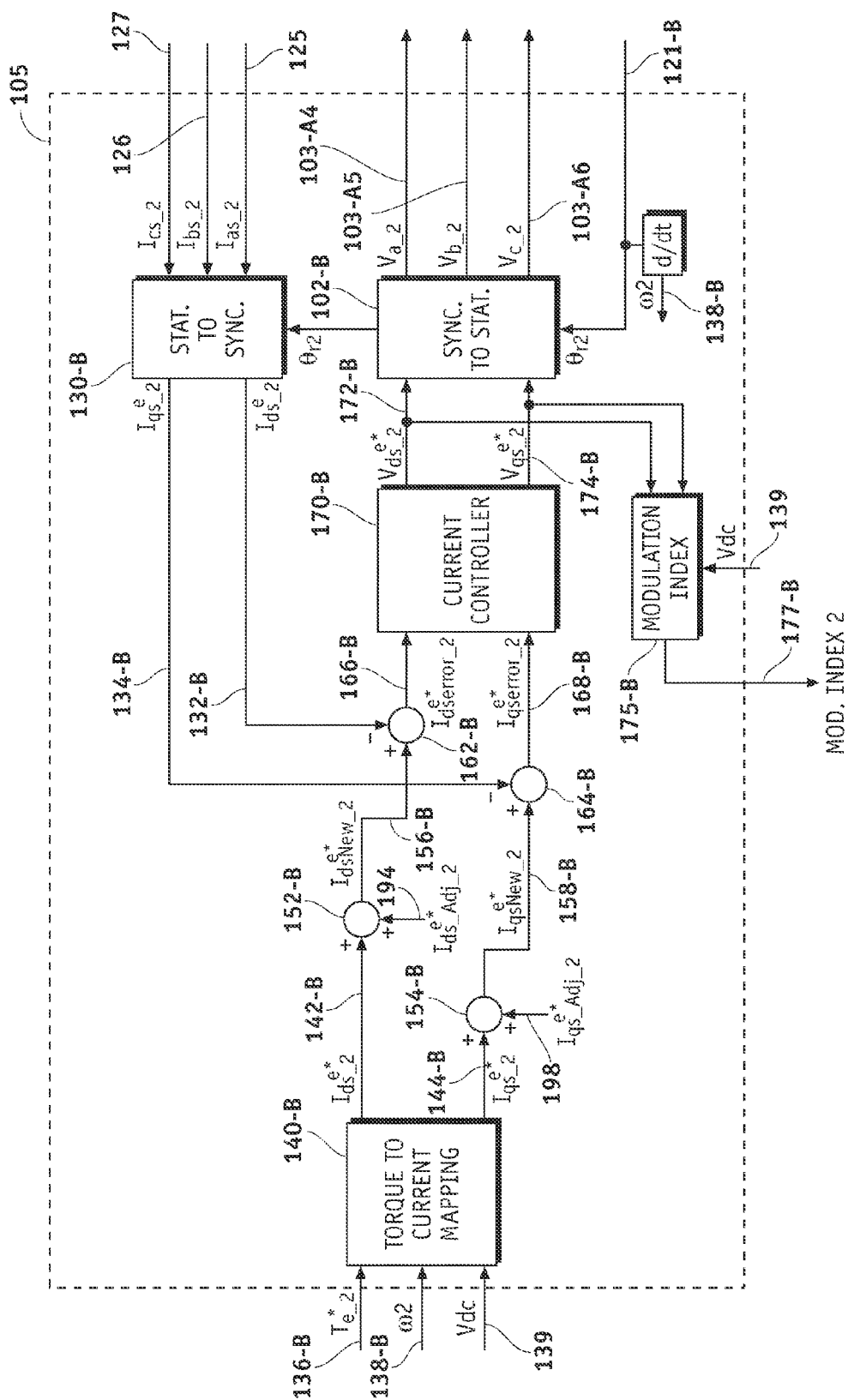

As illustrated in FIG. 1C, the second control loop 105 includes similar blocks or modules as the first control loop 104. The second control loop 105 includes a second stationary-to-synchronous conversion module 130-B, a second torque-to-current mapping module 140-B, a sixth summing junction 152-B, a seventh summing junction 162-B, an eighth summing junction 154-B, a ninth summing junction 164-B, a second current controller module 170-B, a second modulation index computation module 175-B, and a second synchronous-to-stationary conversion module 102-B. As will now be described, the second control loop 105 operates in a similar manner as the first control loop 104.

The second stationary-to-synchronous conversion module 130-B receives the third resultant stator current (Ias_2) 125, a fourth resultant stator current (Ibs_2) 126, a fifth resultant stator current (Ics_2) 127 and the second shaft position output (θ_r2) 121-B, and generates, based on these stator currents 125, 126, 127 and the second shaft position output (θ_r2) 121-B, a second feedback d-axis current signal (Ids_e_2) 132-B and a second feedback q-axis current signal (Iqs_e_2) 134-B.

The second torque-to-current mapping module 140-B receives a second torque command signal (Te*_2) 136-B that is input from a user of the system 100, a second speed (ω2) 138-B of the shaft, and the DC input voltage (Vdc) 139. The second torque-to-current mapping module 140-B maps the second torque command signal (Te*_2) 136-B, the second speed (ω2) 138-B of the shaft, and the DC input voltage (Vdc) 139 to a second d-axis current command signal (Ids_e*_2) 142-B and a second q-axis current command signal (Iqs_e*_2) 144-B as explained above.

The sixth summing junction 152-B receives the second d-axis current command signal (Ids_e*_2) 142-B and the second adjusted d-axis current command signal (Ids_e*_Adj_2) 194 (from the current command adjustment module 106), and adds the second d-axis current command signal (Ids_e*_2) 142-B to the second adjusted d-axis current command signal (Ids_e*_Adj_2) 194 to generate a second new d-axis current command signal (Ids New_e*_2) 156-B.

The seventh summing junction 162-B receives the second new d-axis current command signal (Ids New_e*_2) 156-B and the second feedback d-axis current signal (Ids_e_2) 132-B, and subtracts the second feedback d-axis current signal (Ids_e_2) 132-B from the second new d-axis current command signal (Ids New_e*_2) 156-B to generate a second error d-axis current signal (Idserror_e_1) 166-B.

The eighth summing junction 154-B receives the second q-axis current command signal (Iqs_e*_2) 144-B and the second adjusted q-axis current command signal (Iqs_e*_Adj_2) 198 (from the current command adjustment module 106), and adds the second q-axis current command signal (Iqs_e*_2) 144-B to the second adjusted q-axis current command signal (Iqs_e*_Adj_2) 198 to generate a second new q-axis current command signal (IqsNew_e*_2) 158-B.

The ninth summing junction 164-B receives the second new q-axis current command signal (IqsNew_e*_2) 158-B and the second feedback q-axis current signal (Iqs_e_2) 134-B, and subtracts the second feedback q-axis current signal (Iqs_e_2) 134-B from the second new q-axis current command signal (IqsNew_e*_2) 158-B to generate a second error q-axis current signal (Iqserror_e_2) 168-B.

The second current controller module 170-B receives the second error d-axis current signal (Idserror_e_2) 166-B and the second error q-axis current signal (Iqserror_e_2) 168-B, and generates a second d-axis voltage command signal (Vds_e*_2) 172-B and a second q-axis voltage command signal (Vqs_e*_2) 174-B. The second modulation index computation module 175-B receives the second d-axis voltage command signal (Vds_e*_2) 172-B and the second q-axis voltage command signal (Vqs_e*_2) 174-B, and generates a second modulation index (Mod. Index 2) 177-B as described above.

The second synchronous-to-stationary conversion module 102-B receives the second d-axis voltage command signal (Vds_e*_2) 172-B and the second q-axis voltage command signal (Vqs_e*_2) 174-B, and generates a fourth sinusoidal voltage command (Va_2) 103-A4, a fifth sinusoidal voltage command (Vb_2) 103-A5 and a sixth sinusoidal voltage command (Vc_2) 103-A6.

The first and the second control loop 104 and 105 respectively share the SVPWM module 108. As described above, the SVPWM module 108 receives the sinusoidal voltage commands (Va_1) 103-A1, (Vb_1) 103-A2, (Vc_1) 103-A3 from the first synchronous-to-stationary conversion module 102-A, and also receives the sinusoidal voltage command (Va_2) 103-A4, (Vb_2) 103-A5, (Vc_2) 103-A6 from the second synchronous-to-stationary conversion module 102-B, and uses these signals to generate switching vector signals (Sa) 109-A, (Sb) 109-B, (Sc) 109-C, (Sd) 109-D, and (Se) 109-E.

The five-phase PWM inverter module 110 receives the DC input voltage (Vdc) 139 and switching vector signals 109, and uses them to generate alternating current (AC) waveforms 111-115 that drive the first three-phase AC machine 120-A at varying speeds based on the DC input voltage (Vdc) 139. Although not illustrated in FIG. 1, the system 100 may also include a gear coupled to and driven by the first three-phase AC machine 120-A shaft and the second three-phase AC machine 120-B shaft.

Figure 1D:
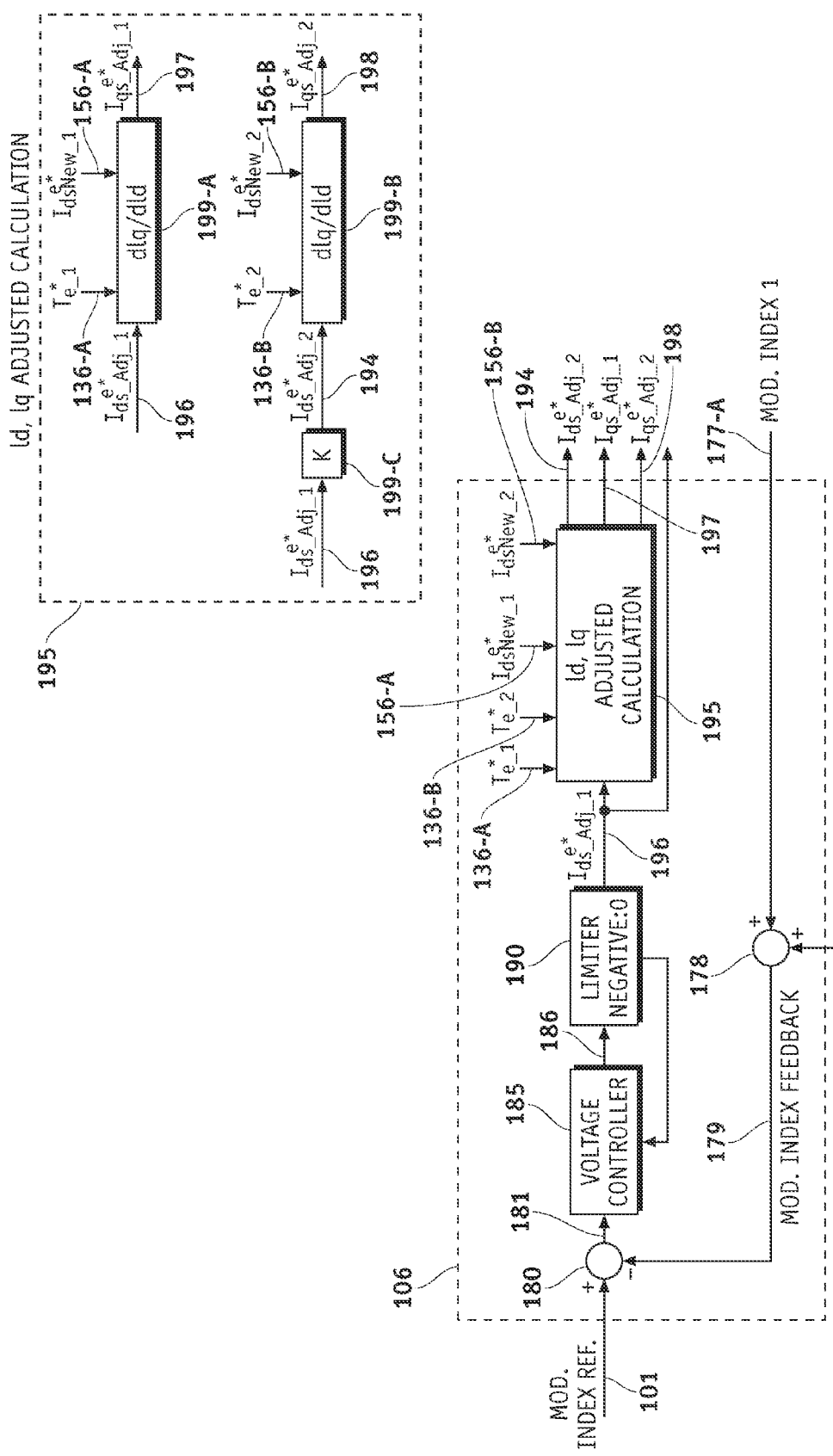

Operation of the current command adjustment module 106 will now be described with reference to FIG. 1D. As illustrated in FIG. 1D, the current command adjustment module 106 includes a first summing junction 180, a voltage controller 185, a negative limiter module 190 and a current adjustment computation module 195. The current command adjustment module 106 operates as follows. The first summing junction 180 receives a modulation index reference signal input 101 and a modulation index feedback signal input 179, and subtracts the modulation index feedback signal input 179 from the modulation index reference signal input 101 to generate a modulation index error signal 181. The voltage controller 185 receives the modulation index error signal 181, and generates a first output command signal 186 based on the modulation index error signal 181. In one implementation, the voltage controller 185 that processes the modulation index error signal 181 can be a Proportional-Integral Controller (PI). The negative limiter module 190 receives the first output command signal 186 and limits the first output command signal 186 between a negative value and zero. The resulting limited value of the first output command signal 186 becomes the adjusted d-axis current command signal (Ids_e*_Adj_1) 196.

The current adjustment computation module 195 receives a first torque command signal (Te*_1) 136-A, a second torque command signal (Te*_2) 136-B, a first new d-axis current command signal (IdsNew_e*_1) 166-A, and a second new d-axis current command signal (Ids New_e*_2) 166-B. When the current adjustment computation module 195 receives the adjusted d-axis current command signal (Ids_e*_Adj_1) 196 (i.e., when its output by the negative limiter module 190), the current adjustment computation module 195 generates a second adjusted d-axis current command signal (Ids_e*_Adj_2) 194 based on the first adjusted d-axis current command signal (Ids_e*_Adj_1) 196, a first adjusted q-axis current command signal (Iqs_e*_Adj_1) 197 and a second adjusted q-axis current command signal (Iqs_e*_Adj_2) 198, based on the first adjusted d-axis current command signal (Ids_e*_Adj_1) 196, the second adjusted d-axis current command signal (Ids_e*_Adj_2) 194, the first torque command signal (Te*_1) 136-A, the second torque command signal (Te*_2) 136-B, the first new d-axis current command signal (IdsNew_e*_1) 166-A, and the second new d-axis current command signal (Ids New_e*_2) 166-B.

In one implementation, the current adjustment computation module 195 can include a first current adjustment computation sub-module 199-A, a second current adjustment computation sub-module 199-B and a scaling block (K) 199-C. The current adjustment computation sub-modules 199-A, 199-B compute a derivative [dIq/dId] of the q-axis current (Tq) with respect to the d-axis current (Id). The partial derivative [dIq/dId] with torque constant is calculated using the equation.

$$T = \frac{3}{2} \cdot \frac{P}{2} \cdot [k_e \cdot I_{qs} - (L_q - L_d) \cdot I_{qs} \cdot I_{ds}]$$

for $I_{ph} \leq I_{max}$ and $V_{ph} \leq K \cdot V_{max}$, where $I_{ph} = \sqrt{I_{ds}^2 + I_{qs}^2}$, the Ids and Iqs currents are calculated such that torque per ampere is maximized with machine parameters and stored in a look-up table as function of the first torque command signal (Te*_1) 136-A and the first new d-axis current command signal (IdsNew_e*_1) 156-A. In one exemplary implementation, the first current adjustment computation sub-module 199-A receives the first adjusted d-axis current command signal (Ids_e*_Adj_1) 196 and multiplies it by the partial derivative [dIq/dId], and use these to generate the first adjusted q-axis current command signal (Iqs_e*_Adj_1) 197. The scaling block (K) receives the first adjusted d-axis current command signal (Ids_e*_Adj_1) 196 and multiply it by a K factor to obtain the second adjusted d-axis current command signal (Ids_e*_Adj_2) 194. The second current adjustment computation sub-module 199-B can receive the second adjusted d-axis current command signal (Ids_e*_Adj_2) 194, the second torque command signal (Te*_2) 136-B and the second new d-axis current command signal (Ids New_e*_2) 156-B and use these to generate the second adjusted q-axis current command signal (Iqs_e*_Adj_2) 198. The first adjusted d-axis current command signal (Ids_e*_Adj_1) 196, the first adjusted q-axis current command signal (Iqs_e*_Adj_1) 197, the second adjusted q-axis current command signal (Iqs_e*_Adj_2) 198 and the second adjusted d-axis current command signal (Ids_e*_Adj_2) 194 are used to modify the original current command signals (i.e., the first d-axis current command signal (Ids_e*_1) 142-A, the first q-axis current command signal (Iqs_e*_1) 144-A, the second d-axis current command signal (Ids_e*_1) 142-B and the second q-axis current command signal (Iqs_e*_2) 144-B) to allow machines 120-A, 120-B to output a given mechanical power with less phase voltage (i.e. it allows sharing the voltage available between both machines without compromising output power).

Figure 2A:
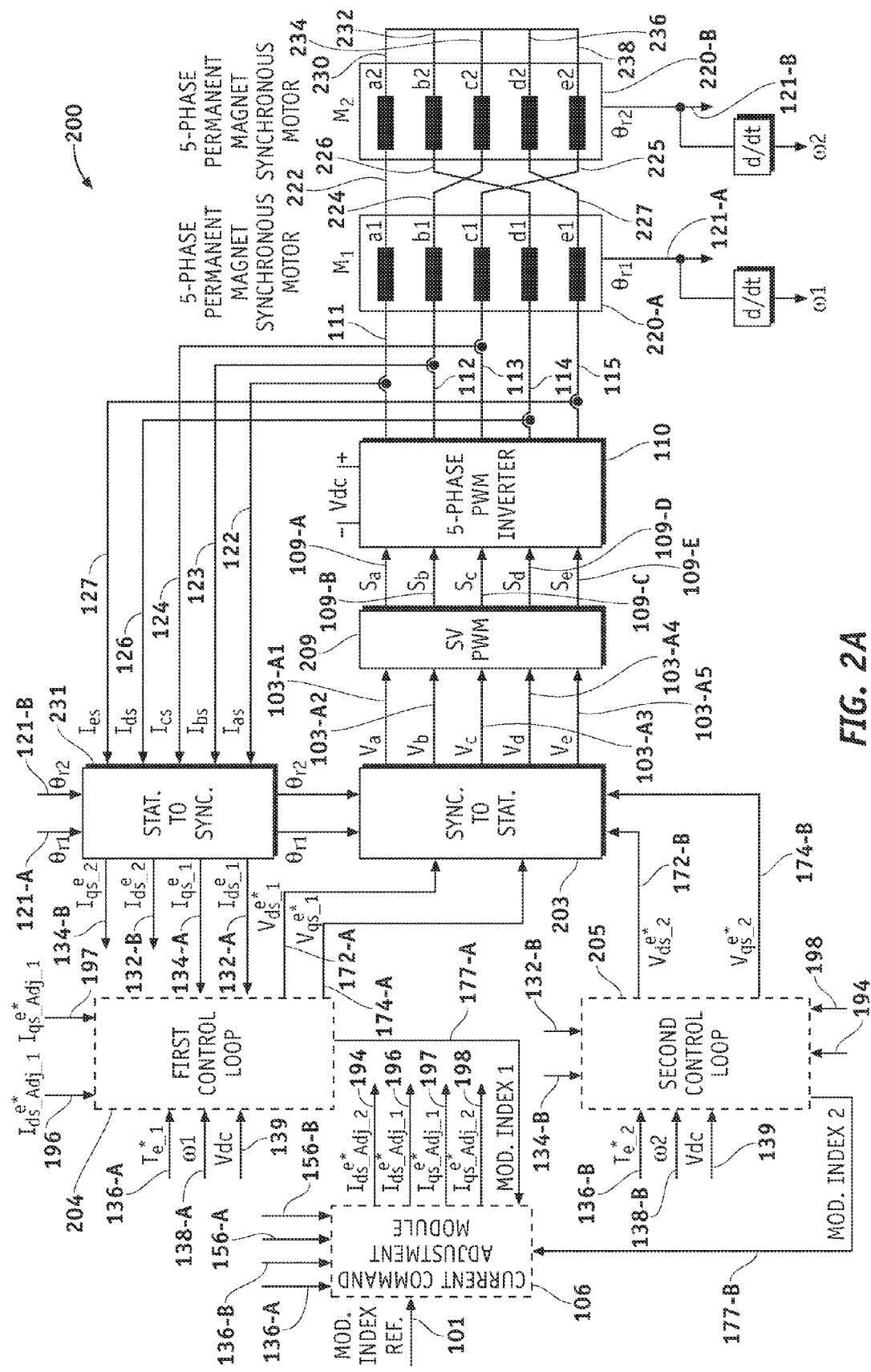
FIGS. 2A-C illustrate block diagrams of a torque control system 200 architecture implemented in a motor drive system of a hybrid/electric vehicle (HEV) according to one exemplary implementation of the present invention.
Figure 2B:
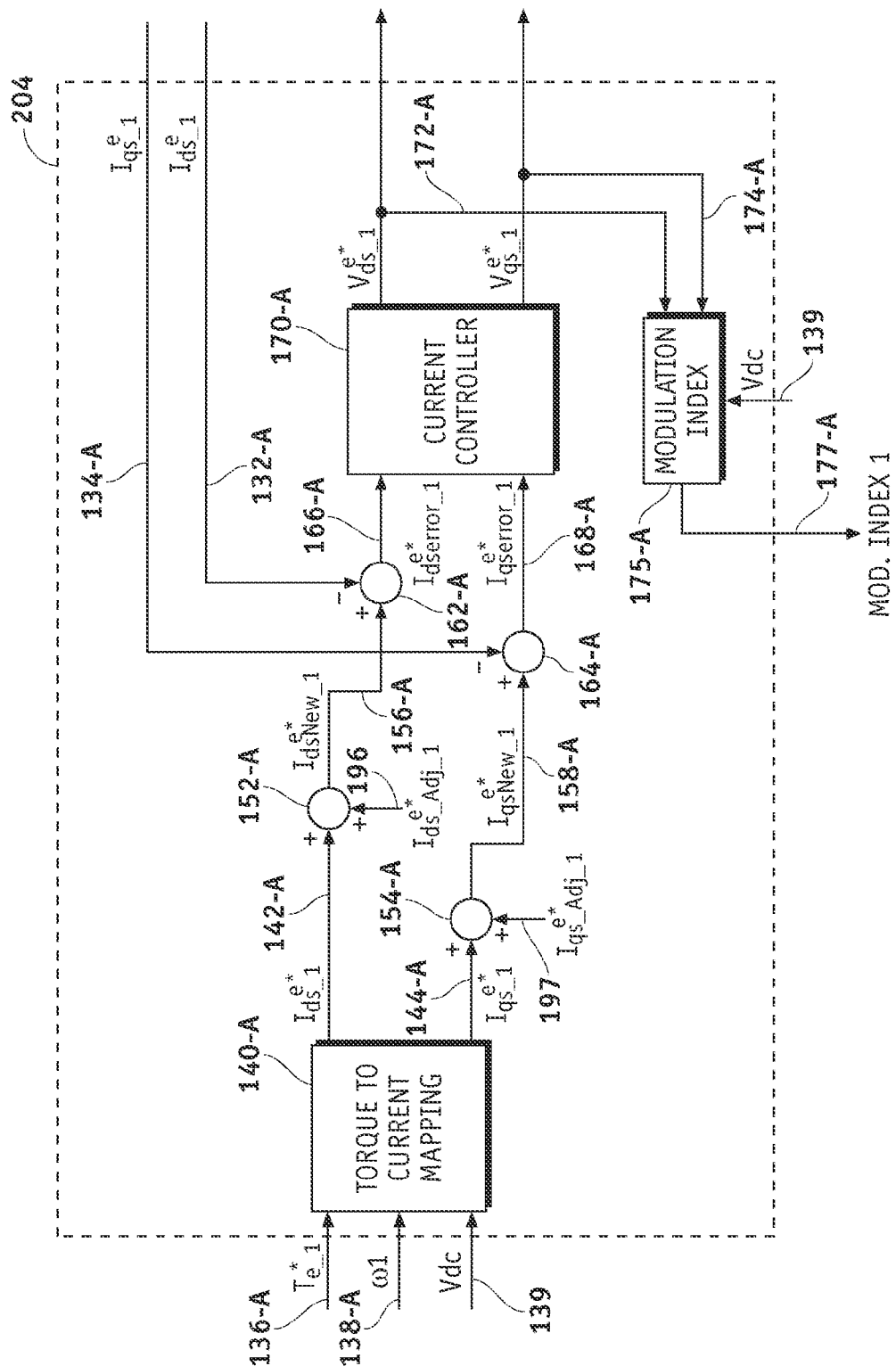
Figure 2C:
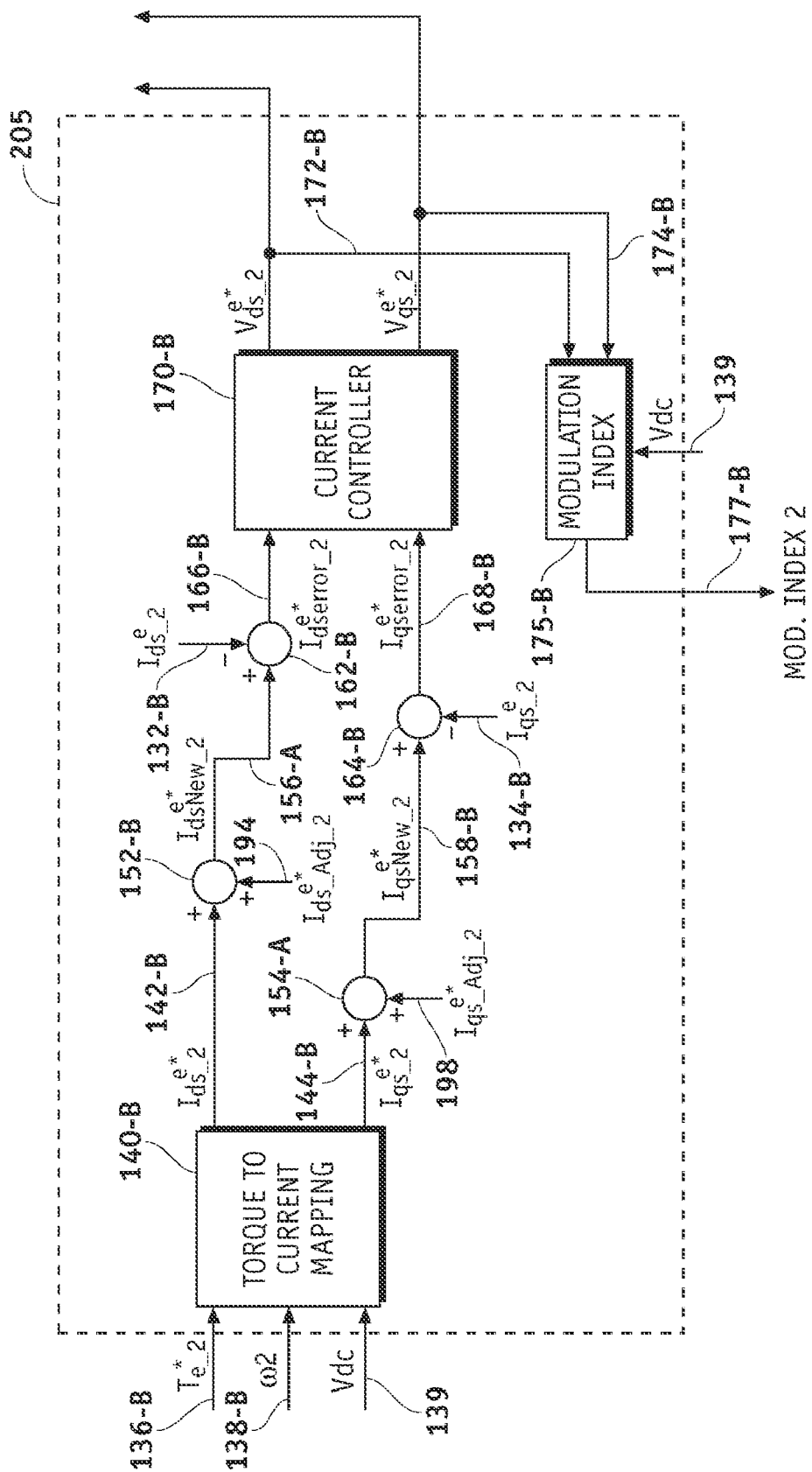

FIGS. 2A-C illustrate block diagrams of a torque control system 200 architecture implemented in a motor drive system of a hybrid/electric vehicle (HEV) according to one exemplary implementation of the present invention.

As illustrated in FIG. 2A, this embodiment differs from that illustrated in FIG. 1 in that the system 200 includes two five-phase AC machines 220-A, 220-B instead of two three-phase AC machine 120-A, 120-B. The two five-phase AC machines 220-A, 220-B are coupled to each other, and the five-phase PWM inverter module 110 is connected to one of the five-phase AC machines 220-A, which is in turn coupled to the other one of the two five-phase AC machines 220-B. The system 200 includes a first control loop 204 and a second control loop 205. The first control loop 204 and the second control loop 205 are both coupled to the five-phase PWM inverter module 110 via synchronous to stationary block 203 and SVPWM block 209.

The five-phase PWM inverter module 110 is coupled to the Space Vector (SV) PWM module 209. The five-phase PWM inverter module 110 receives a first switching vector signal (Sa) 109-A, a second switching vector signal (Sb) 109-B, a third switching vector signal (Sc) 109-C, a fourth switching vector signal (Sd) 109-D, and a fifth switching vector signal (Se) 109-E. The five-phase PWM inverter module 110 includes a first inverter pole 111 that outputs a first sinusoidal voltage (Va_*), a second inverter pole 112 that outputs a second sinusoidal voltage (Vb_*), a third inverter pole 113 that outputs a third sinusoidal voltage (Vc_*), a fourth inverter pole 114 that outputs a fourth sinusoidal voltage (Vd_*), and a fifth inverter pole 115 that outputs a fifth sinusoidal voltage (Ve_*).

The first five-phase AC machine 220-A is coupled to the five-phase PWM inverter module 110 via the first inverter pole 111, the second inverter pole 112, the third inverter pole 113, the fourth inverter pole 114 and the fifth inverter pole 115. The first five-phase AC machine 220-A generates output mechanical power (torque×speed) based on the first sinusoidal voltage (Va*), the second sinusoidal voltage (Vb*), the third sinusoidal voltage (Vc*), the fourth sinusoidal voltage (Vd*) and the fifth sinusoidal voltage (Ve*). In addition, a first shaft position output (θ_r1) 121-A can be measured from the first five-phase AC machine 220-A. The first five-phase AC machine 220-A also includes a first output link (a1) 222 that outputs a first output voltage, a second output link (b1) 224 that outputs a second output voltage, a third output link (c1) 225 that outputs a third output voltage, a fourth output link (d1) 226 that outputs a fourth output voltage, and a fifth output link (e1) 227 that outputs a fifth output voltage. Each output link (a1 . . . e1) is coupled to a motor winding of the second five-phase AC machine 220-B so that the second five-phase AC machine 220-B is coupled to the first five-phase AC machine 220-A via the first output link (a1) 222, the second output link (b1) 224, the third output link (c1) 225, the fourth output link (d1) 226, and the fifth output link (e1) 227.

The second five-phase AC machine 220-B outputs its own mechanical power output based on voltage at output links 222 . . . 227. Links (a2 . . . e2) that are coupled together to form a star connection in second five-phase AC machine 220-B. The shaft is part of each machine, the machine function is convert electrical power to mechanical power or vice-versa. The second five-phase AC machine 220-B outputs a second shaft position output (θ_r2) 121-B.

As in the first embodiment described with reference to FIG. 1B, the first control loop 204 includes a first torque-to-current mapping module 140-A, a second summing junction 152-A, a third summing junction 162-A, a fourth summing junction 154-A, a fifth summing junction 164-A, a first current controller module 170-A, and a first modulation index computation module 175-A, as illustrated in FIG. 2B. Likewise, as illustrated in FIG. 2C, the second control loop 205 includes a second torque-to-current mapping module 140-B, a sixth summing junction 152-B, a seventh summing junction 162-B, an eighth summing junction 154-B, a ninth summing junction 164-B, a second current controller module 170-B, and a second modulation index computation module 175-B. Each of these junctions and modules operates as described with reference to FIG. 1 and for sake of brevity the description of their operation will not be described here again. Moreover, the current command adjustment module 106 operates in the same manner as in the first embodiment (FIGS. 1A-D), and for sake of brevity, the operation of the current command adjustment module 106 will not be repeated here.

The embodiment of FIG. 2A also differs from the embodiment illustrated in FIG. 1A in that the first control loop 204 and the second control loop 205 of the system 200 share a stationary-to-synchronous conversion module 231, and a synchronous-to-stationary conversion module 203. Operation of these modules will now be described.

The stationary-to-synchronous conversion module 231 is coupled to the five-phase PWM inverter module 110 so that it receives a first resultant stator current (I_as) 122, a second resultant stator current (I_bs) 123, a third resultant stator current (I_cs) 124, a fourth resultant stator current (I_ds) 126, a fifth resultant stator current (I_es) 127, a first shaft position output (θ_r1) 121-A, and a second shaft position output (θ_r2). The stationary-to-synchronous conversion module 231 is designed to convert these stator currents 122, 123, 124, 126, 127 to generate current feedback signals 132-A, 132-B, 134-A, 134-B. In particular, the stationary-to-synchronous conversion module 231 generates a first feedback d-axis current signal (Ids_e_1) 132-A, a first feedback q-axis current signal (Iqs_e_1) 134-A, a second feedback d-axis current signal (Ids_e_1) 132-B and a second feedback q-axis current signal (Iqs_e_1) 134-B, based on the first resultant stator current (I_as) 122, the second resultant stator current (I_bs) 123, the third resultant stator current (I_cs) 124, the fourth resultant stator current (I_ds) 126, the fifth resultant stator current (I_es) 127, the first shaft position output (θ_r1) 121-A, and the second shaft position output (θ_r2) by using equations (1) through (3) below.

$$T_5 = \frac{2}{5}\begin{bmatrix} 1 & \cos\alpha & \cos 2\alpha & \cos 2\alpha & \cos\alpha \\ 0 & \sin\alpha & \sin 2\alpha & -\sin 2\alpha & -\sin\alpha \\ 1 & \cos 2\alpha & \cos\alpha & \cos\alpha & \cos 2\alpha \\ 0 & -\sin 2\alpha & \sin\alpha & -\sin\alpha & \sin 2\alpha \\ 1/\sqrt{2} & 1/\sqrt{2} & 1/\sqrt{2} & 1/\sqrt{2} & 1/\sqrt{2} \end{bmatrix}, \quad (1)$$

where $\alpha = 2\pi/5$

-continued $$R_5(\theta) = \begin{bmatrix} R_2(\theta_1) & 0 & 0 \\ 0 & R_2(\theta_2) & 0 \\ 0 & 0 & 1 \end{bmatrix}, \text{where} \quad (2)$$

$$R_2(\theta) = \begin{bmatrix} \cos\theta & \sin\theta \\ -\sin\theta & \cos\theta \end{bmatrix}$$

$$I_{dq} = R_5 \times T_5 \times I_{abcde} \quad (3)$$

$$V_{abcde} = R_5^{-1} \times T_5^{-1} \times V_{dq} \quad (4)$$

The synchronous-to-stationary conversion module 203 receives the first d-axis voltage command signal (Vds_e*_1) 172-A, the first q-axis voltage command signal (Vqs_e*_1) 174-A, the second d-axis voltage command signal (Vds_e*_1) 172-B, the second q-axis voltage command signal (Vqs_e*_1) 174-B, the first shaft position output (θ_r1) 121-A and the second shaft position output (θ_r2) 121-B. Using these inputs and equations (1), (2) and (4) above, the synchronous-to-stationary conversion module 203 generates a first sinusoidal voltage command (Va) 103-A1, a second sinusoidal voltage command (Vb) 103-A2, a third sinusoidal voltage command (Vc) 103-A3, a fourth sinusoidal voltage command (Vd) 103-A4, and a fifth sinusoidal voltage command (Ve) 103-A5.

The Space Vector (SV) PWM module 209 is coupled to the synchronous-to-stationary conversion module 203 and receives the first sinusoidal voltage command (Va) 103-A1, the second sinusoidal voltage command (Vb) 103-A2, the third sinusoidal voltage command (Vc) 103-A3, the fourth sinusoidal voltage command (Vd) 103-A4, and the fifth sinusoidal voltage command (Ve) 103-A5. Based on these inputs, the SV PWM module 209 generates a first switching vector signal (Sa) 109-A, a second switching vector signal (Sb) 109-B, a third switching vector signal (Sc) 109-C, a fourth switching vector signal (Sd) 109-D, and a fifth switching vector signal (Se) 109-E.

FIGS. 3A-3D illustrate block diagrams of a torque control system 300 architecture implemented in a motor drive system of a hybrid/electric vehicle (HEV) according to one exemplary implementation of the present invention.

Figure 3A:
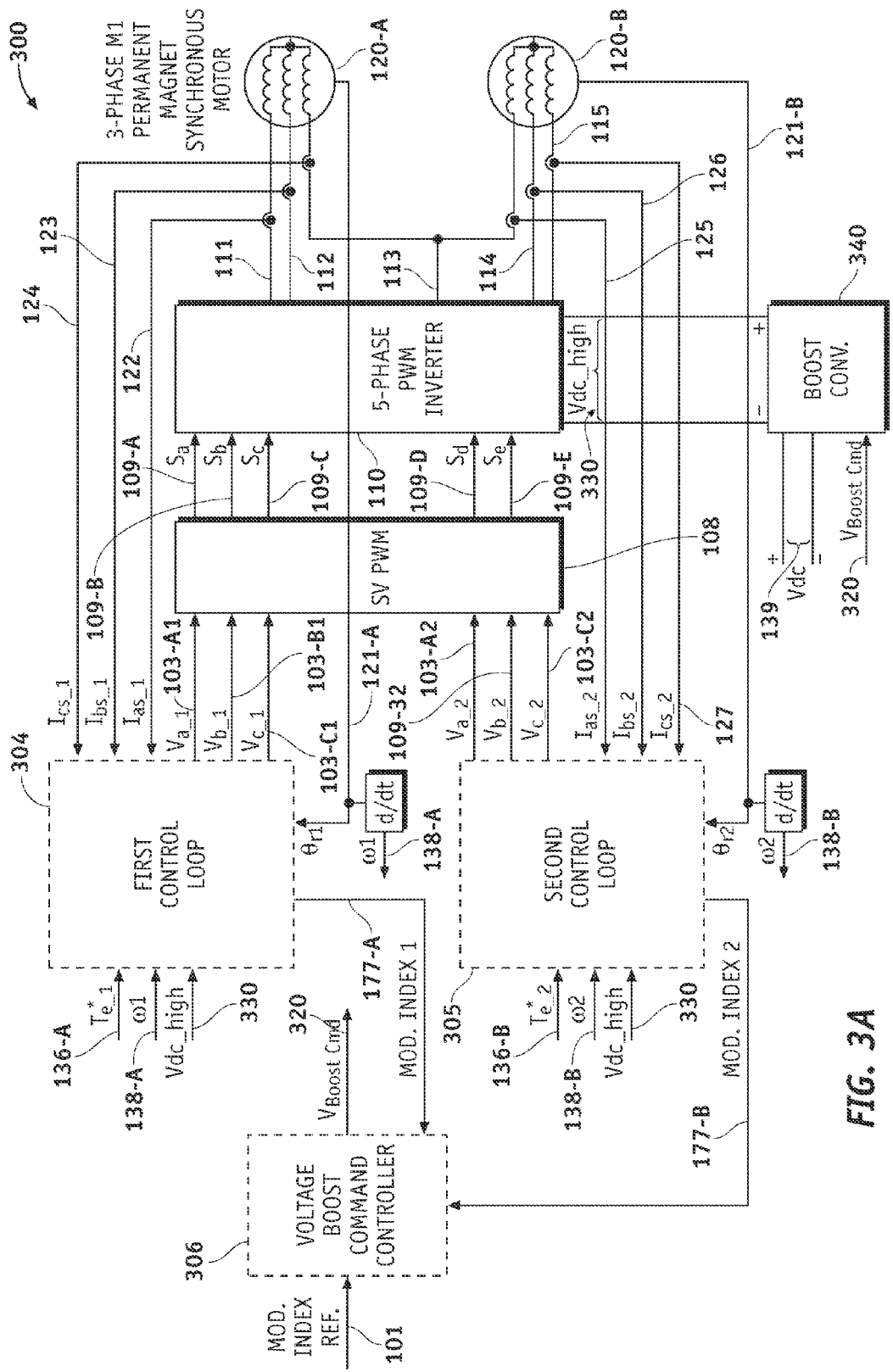
FIGS. 3A-3D illustrate block diagrams of a torque control system 300 architecture implemented in a motor drive system of a hybrid/electric vehicle (HEV) according to one exemplary implementation of the present invention.

As illustrated in FIG. 3A, the system 300 comprises a first control loop 304, a second control loop 305, the five-phase PWM inverter module 110, a first three-phase AC machine 120-A coupled to the five-phase PWM inverter module 110, a second three-phase AC machine 120-B coupled to the five-phase PWM inverter module 110, and a voltage boost command control loop 306 coupled to the first control loop 304 and the second control loop 305. The three-phase AC machines are three-phase AC powered motors.

The five-phase PWM inverter module 110 is coupled to SVPWM module 108. The SVPWM module 108 is coupled to the first control loop 304 and the second control loop 305 such that the SVPWM module 108 receives modulation voltage commands Va* ... Ve*, which are compared with a carrier to generate switching vector signals Sa ... Se 109. The five-phase PWM inverter module 110 receives switching vector signals 109 and generates sinusoidal voltage signals. In the particular embodiment, the five-phase PWM inverter module 110 receives a first switching vector signal (Sa) 109-A, a second switching vector signal (Sb) 109-B, a third switching vector signal (Sc) 109-C, a fourth switching vector signal (Sd) 109-D, and a fifth switching vector signal (Se) 109-E. The five-phase PWM inverter module 110 includes a plurality of inverter poles including a first inverter pole 111 that outputs a first sinusoidal voltage (Va_*), a second inverter pole 112 that outputs a second sinusoidal voltage (Vb_*), a third inverter pole 113 that outputs a third sinusoidal voltage (Vc_*), a fourth inverter pole 114 that outputs a fourth sinusoidal voltage (Vd_*), and a fifth inverter pole 115 that outputs a fifth sinusoidal voltage (Ve_*).

The first three-phase AC machine 120-A is coupled to the five-phase PWM inverter module 110 via the first inverter pole 111, the second inverter pole 112 and the third inverter pole 113. The first three-phase AC machine 120-A generates mechanical power (torque×speed) and a first shaft position output (θ_r1) based on the first sinusoidal voltage (Va_*), the second sinusoidal voltage (Vb_*) and the third sinusoidal voltage (Vc_*).

The second three-phase AC machine 120-B is coupled to the five-phase PWM inverter module 110 via the third inverter pole 113, the fourth inverter pole 114 and the fifth inverter pole 115. In other words, the second three-phase AC machine 120-B and the first three-phase AC machine 120-A share the third inverter pole 113. The second three-phase AC machine 120-B generates mechanical power (torque×speed) and a second shaft position output (θ_r2) based on the third sinusoidal voltage (Vc_*), the fourth sinusoidal voltage (Vd_*) and the fifth sinusoidal voltage (Ve_*).

As in the embodiment described with respect to FIG. 1A, the five-phase PWM inverter module 110 can be used to control two three-phase AC machines 120. However, this embodiment differs from that illustrated in FIG. 1A since the system 300 in FIG. 3A further includes a boost converter 340 coupled to the five-phase PWM inverter module 110 so that a DC input voltage (Vdc) 139 can be "boosted" or increased to a boosted DC input voltage (Vdc_high) 330 when the two three-phase AC machines 120 require additional voltage that exceeds the DC input voltage (Vdc) 139. The boosted DC input voltage (Vdc_high) 330 can be provided to the five-phase PWM inverter module 110 when the boost converter 340 coupled to the five-phase PWM inverter module 110 receives a boost command signal (VBoost_command) 320. The five-phase PWM inverter module 110 can then use the boosted DC input voltage (Vdc_high) 330 to provide sinusoidal voltages (Va_* ... Ve_*) that have an increased voltage to the two three-phase AC machines 120. As will be explained in greater detail below, the voltage boost command control loop 306 receives a first modulation index (Mod. Index 1) 177-A and a second modulation index (Mod. Index 2) 177-B from the first control loop 304 and the second control loop 305 and generates a modulation index feedback signal input 179 based on the first modulation index (Mod. Index 1) 177-A and the second modulation index (Mod. Index 2) 177-B.

Prior to describing the operation of the voltage boost command control loop 306, operation of the first control loop 304 and the second control loop 305 will be described. This embodiment differs from that illustrated in FIGS. 1B and 1C since the first control loop 304 and the second control loop 305 of system 300 are somewhat simplified and use fewer summing junctions, as will now be described below.

Figure 3B:
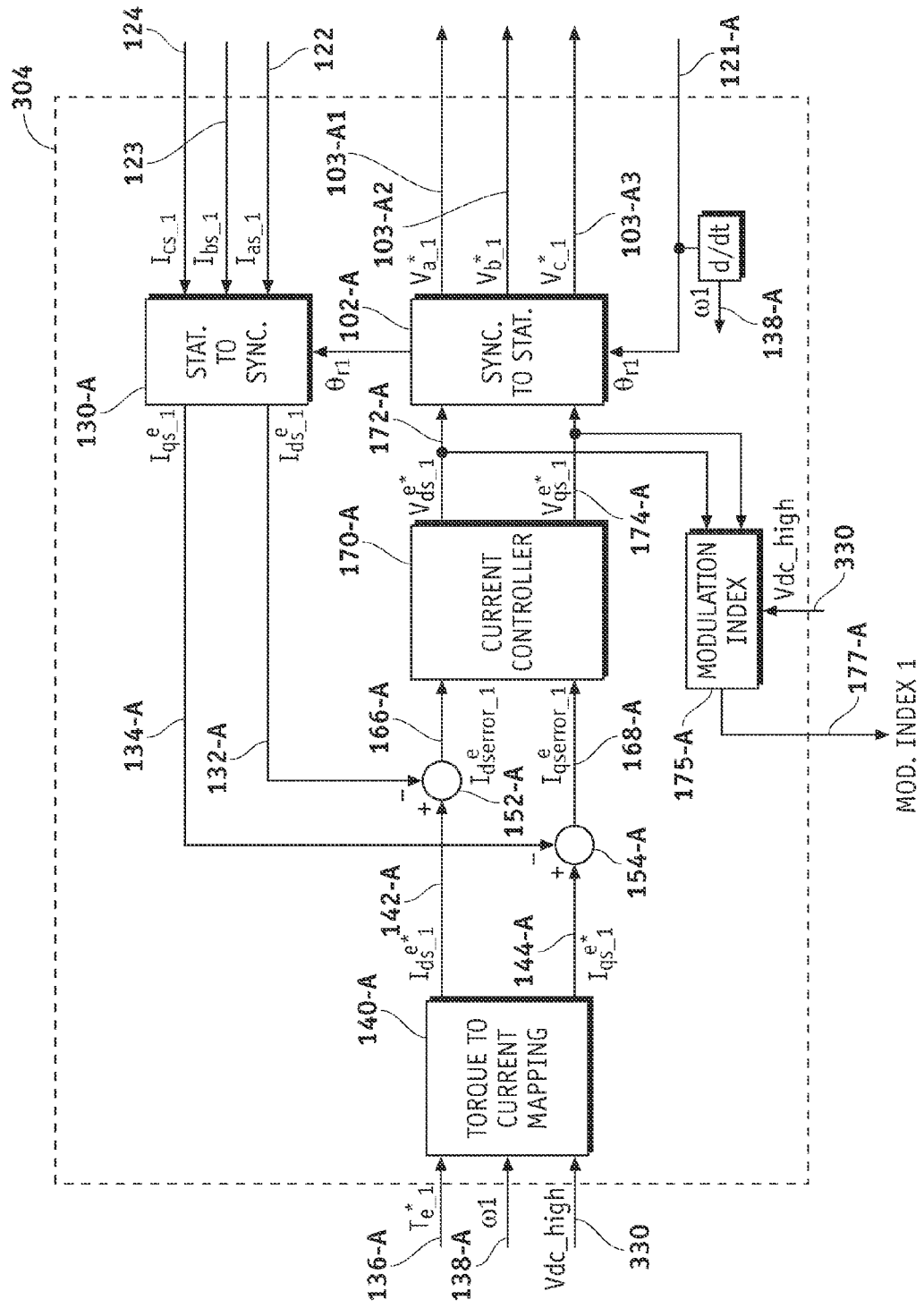

As illustrated in FIG. 3B, the first control loop 304 includes a first stationary-to-synchronous conversion module 130-A, a first torque-to-current mapping module 140-A, a summing junction 152-A, a summing junction 154-A, a first current controller module 170-A, a first modulation index computation module 175-A, and a first synchronous-to-stationary conversion module 102-A. Operation of the first control loop 304 will now be described.

The first stationary-to-synchronous conversion module 130-A and the first torque-to-current mapping module 140-A operate in the same manner described above with respect to FIG. 1 and for sake of brevity their respective operation will not be described again.

In this embodiment, upon receiving the first d-axis current command signal (Ids_e*_1) 142-A and the first feedback d-axis current signal (Ids_e_1) 132-A, the summing junction 152-A subtracts the first feedback d-axis current signal (Ids_e_1) 132-A from the first d-axis current command signal (Ids_e*_1) 142-A to generate a first error d-axis current signal (Idserror_e_1) 166-A. Similarly, upon receiving the first q-axis current command signal (Iqs_e*_1) 144-A and the first feedback q-axis current signal (Iqs_e_1) 134-A, the summing junction 154-A subtracts the first feedback q-axis current signal (Iqs_e_1) 134-A from the first q-axis current command signal (Iqs_e*_1) 144-A to generate a first error q-axis current signal (Iqserror_e_1) 168-A.

The first current controller module 170-A receives the first error d-axis current signal (Idserror_e_1) 166-A and the first error q-axis current signal (Iqserror_e_1) 168-A and uses these signals to generate a first d-axis voltage command signal (Vds_e*_1) 172-A and a first q-axis voltage command signal (Vqs_e*_1) 174-A.

The first modulation index computation module 175-A, and the first synchronous-to-stationary conversion module 102-A operate in the same manner described above with respect to FIG. 1 and for sake of brevity their respective operation will not be described again.

Figure 3C:
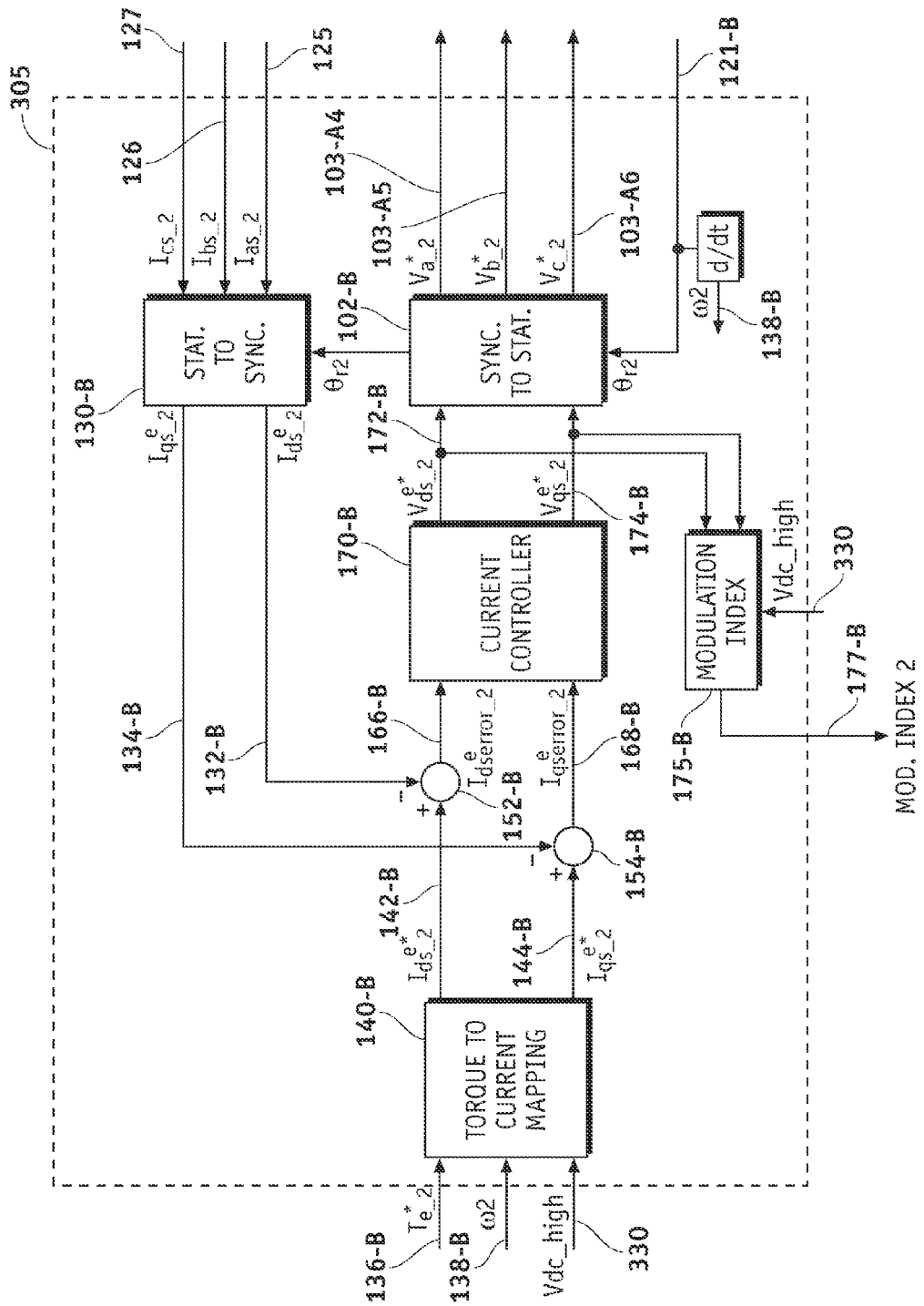

As illustrated in FIG. 3C, the second control loop 305 includes similar blocks or modules as the first control loop 304. The second control loop 305 includes a second stationary-to-synchronous conversion module 130-B, a second torque-to-current mapping module 140-B, a summing junction 152-B, summing junction 154-B, a second current controller module 170-B, a second modulation index computation module 175-B, and a second synchronous-to-stationary conversion module 102-B. As will now be described, the second control loop 305 operates in a similar manner as the first control loop 304.

The second stationary-to-synchronous conversion module 130-B, and the second torque-to-current mapping module 140-B operate in the same manner described above with respect to FIG. 1 and for sake of brevity their respective operation will not be described again.

The summing junction 152-B receives the second d-axis current command signal (Ids_e*_2) 142-B and the second feedback d-axis current signal (Ids_e_1) 132-B, and subtracts the second feedback d-axis current signal (Ids_e_1) 132-B from the second d-axis current command signal (Ids_e*_2) 142-B to generate a second error d-axis current signal (Idserror_e_2) 166-B.

The summing junction 154-B receives the second q-axis current command signal (Iqs_e*_2) 144-B and the second feedback q-axis current signal (Iqs_e_2) 134-B, and subtracts the second feedback q-axis current signal (Iqs_e_2) 134-B from the second q-axis current command signal (Iqs_e*_2) 144-B to generate a second error q-axis current signal (Iqserror_e_2) 168-B.

The second current controller module 170-B receives the second error d-axis current signal (Idserror_e_2) 166-B and the second error q-axis current signal (Iqserror_e_2) 168-B, and generates a second d-axis voltage command signal (Vds_e*_1) 172-B and a second q-axis voltage command signal (Vqs_e*_1) 174-B.

The second modulation index computation module 175-B, and the second synchronous-to-stationary conversion module 102-B operate in the same manner described above with respect to FIG. 1 and for sake of brevity their respective operation will not be described again.

Figure 3D:
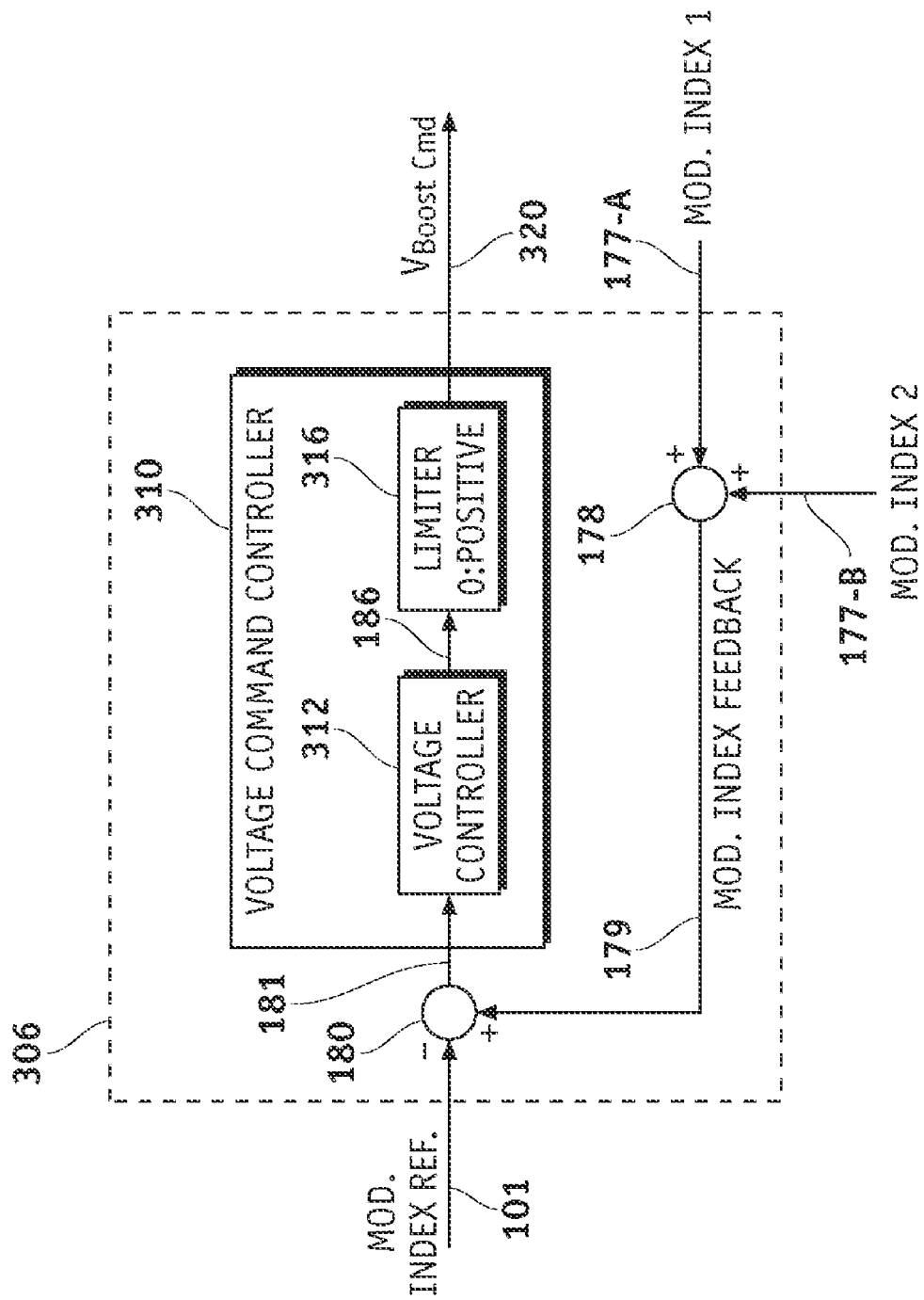

Operation of the voltage boost command control loop 306 will now be described with reference to FIG. 3D. As illustrated in FIG. 3D, the voltage boost command control loop 306 includes a summing junction 180, a voltage controller 312, and a negative limiter module 360. The voltage boost command control loop 306 operates as follows. The summing junction 180 receives a modulation index reference signal input 101 and a modulation index feedback signal input 179, and subtracts the modulation index reference signal input 101 from the modulation index feedback signal input 179 from to generate a modulation index error signal 181. The voltage controller 312 receives the modulation index error signal 181, and generates a first output command signal 186 based on the modulation index error signal 181 using a Proportional-Integral (PI) controller. The positive limiter module 316 receives the first output command signal 186, and allows the first output command signal 186 to pass when it is in the range from zero to a positive value. The output of the positive limiter module 316 becomes the voltage boost command signal (V_Boost_Cmd) 320 based on the first output command signal 186.

When the voltage boost command signal (V_Boost_Cmd) 320 is generated by the voltage command controller 310, it is supplied to the boost converter 340. When the voltage boost command signal (V_Boost_Cmd) 320 received by the boost converter 340 is equal to zero, the boost converter provides the normal DC input voltage (Vdc) 139 to the five-phase PWM inverter module 110. When the two three-phase AC machines 120 require additional voltage that exceeds the DC input voltage (Vdc) 139 required to meet a combined target mechanical power required by the two three-phase AC machines 120, the voltage command controller 310 will generate the voltage boost command signal (V_Boost_Cmd) 320 that controls the boost converter 340 such that the boost converter 340 generates the new boosted DC input voltage (Vdc_high) in response to the voltage boost command signal (V_Boost_Cmd) 320 that has a value greater than the normal DC input voltage (Vdc) 139. When the voltage boost command signal (V_Boost_Cmd) 320 received by the boost converter 340 is greater than zero, it increases or "boosts" the DC input voltage (Vdc) 139 and provides a boosted DC input voltage (Vdc_high) 330 to the five-phase PWM inverter module 110. The five-phase PWM inverter module 110 can then use the boosted DC input voltage (Vdc_high) 330 to provide sinusoidal voltages (Va_* . . . Ve_*) that have an increased voltage to the two three-phase AC machines 120.

Thus, the five-phase PWM inverter module 110 receives the switching vector signals 109 and the boosted DC input voltage (Vdc_high) 330, which can be equal to the normal DC input voltage (Vdc) 139 or higher, and uses it to generate sinusoidal voltage waveforms on links 111-115 that drive the first three-phase AC machines 120-A, 120-B at varying speeds.

Although not illustrated in FIG. 3A, the system 300 also includes a gear coupled to and driven by the first three-phase AC machine 120-A shaft and the second three-phase AC machine 120-B shaft.

Figure 4A:
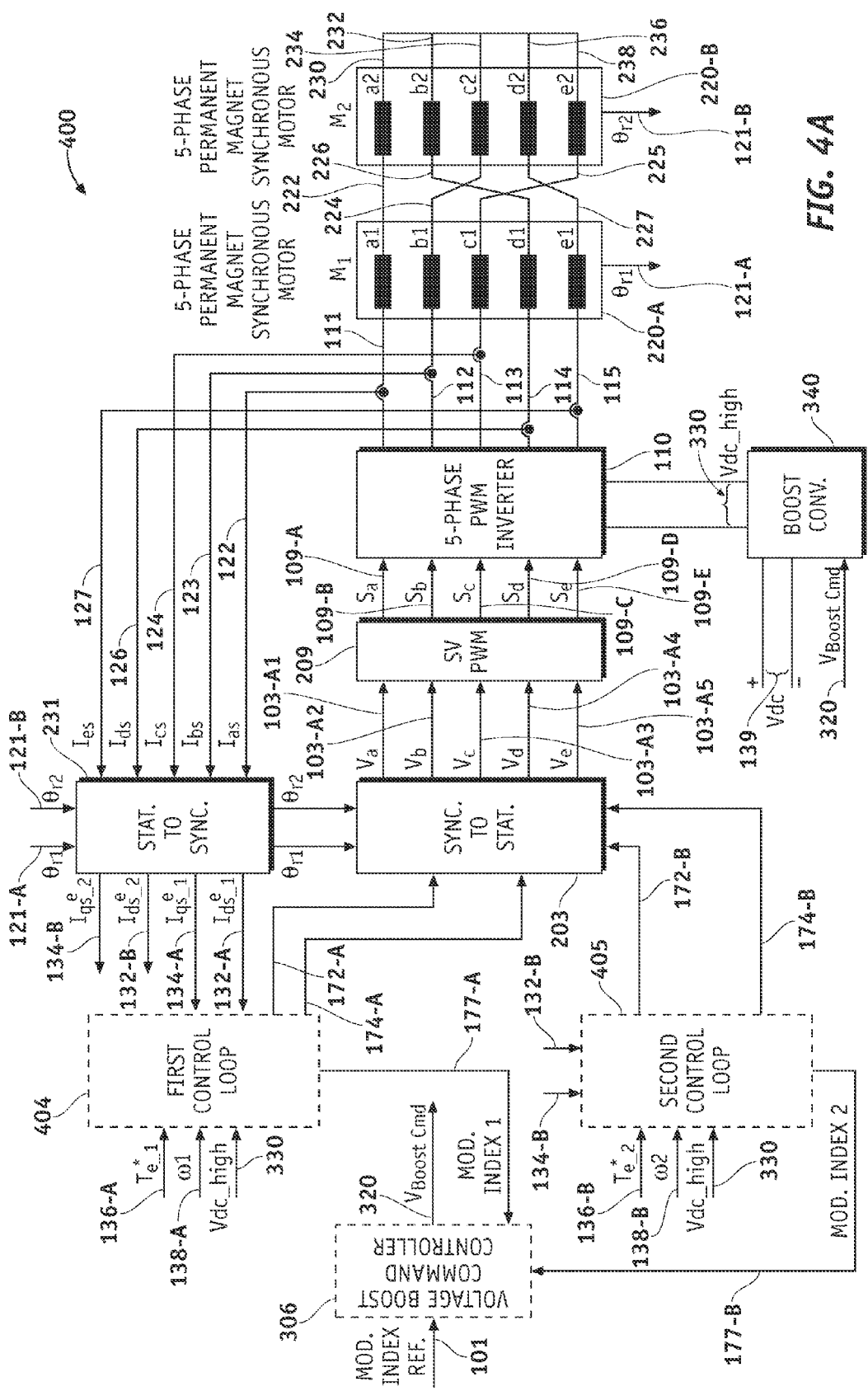
FIGS. 4A-4C illustrate block diagrams of a torque control system 400 architecture implemented in a motor drive system of a hybrid/electric vehicle (HEV) according to one exemplary implementation of the present invention.
Figures 4B, 4C:
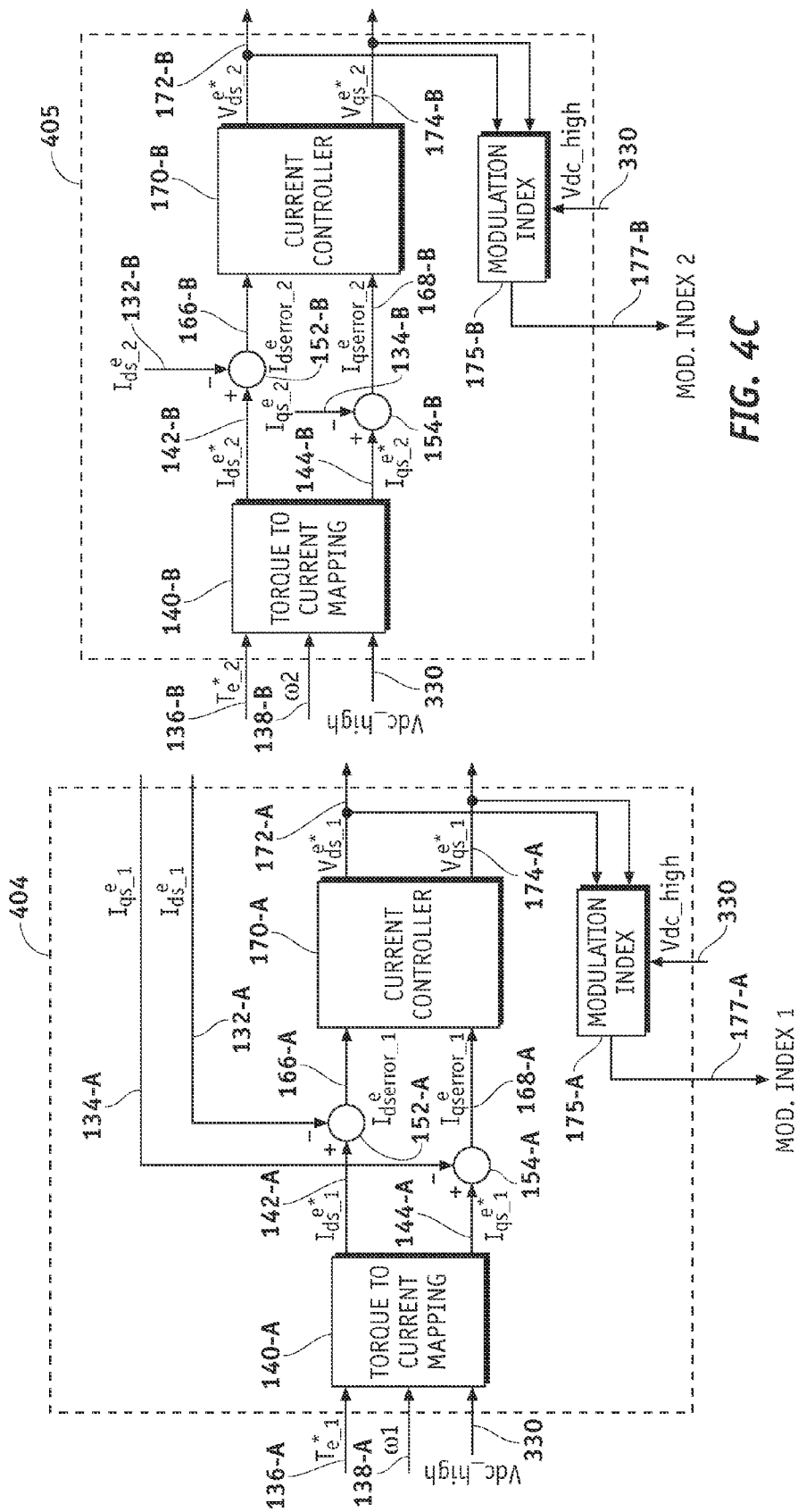

FIGS. 4A-4C illustrate block diagrams of a torque control system 400 architecture implemented in a motor drive system of a hybrid/electric vehicle (HEV) according to one exemplary implementation of the present invention.

As illustrated in FIG. 4A, this embodiment differs from that illustrated in FIG. 3A in that the system 400 includes two five-phase AC machines 220-A, 220-B instead of two three-phase AC machines 120-A, 120-B. The two five-phase AC machines 220-A, 220-B are coupled to each other, and the five-phase PWM inverter module 110 is connected to one of the five-phase AC machines 220-A, which is in turn coupled to the other one of the five-phase AC machines 220-B. The system 400 includes a first control loop 304 and a second control loop 305. The first control loop 304 and the second control loop 305 are both coupled to the five-phase PWM inverter module 110. The embodiment of FIG. 4A also differs from the embodiment illustrated in FIG. 3A in that the first control loop 304 and the second control loop 305 of the system 400 share a stationary-to-synchronous conversion module 231, and a synchronous-to-stationary conversion module 203. Operation of these modules is the same as described above with respect to FIGS. 2A-2C and for sake of brevity their respective operation will not be described again.

The five-phase PWM inverter module 110 is coupled to the Space Vector (SV) PWM module 209. The five-phase PWM inverter module 110 receives a first switching vector signal (Sa) 109-A, a second switching vector signal (Sb) 109-B, a third switching vector signal (Sc) 109-C, a fourth switching vector signal (Sd) 109-D, and a fifth switching vector signal (Se) 109-E. The five-phase PWM inverter module 110 includes a first inverter pole 111 that outputs a first sinusoidal voltage (Va_*), a second inverter pole 112 that outputs a second sinusoidal voltage (Vb_*), a third inverter pole 113 that outputs a third sinusoidal voltage (Vc_*), a fourth inverter pole 114 that outputs a fourth sinusoidal voltage (Vd_*), and a fifth inverter pole 115 that outputs a fifth sinusoidal voltage (Ve_*).

The first five-phase AC machine 220-A is coupled to the five-phase PWM inverter module 110 via the first inverter pole 111, the second inverter pole 112, the third inverter pole 113, the fourth inverter pole 114 and the fifth inverter pole 115. The first five-phase AC machine 220-A generates output mechanical power (torque×speed) based on the first sinusoidal voltage (Va_*), the second sinusoidal voltage (Vb_*), the third sinusoidal voltage (Vc_*), the fourth sinusoidal voltage (Vd_*) and the fifth sinusoidal voltage (Ve_*). In addition, a first shaft position output ($\theta$_r1) 121-A can be measured from the first five-phase AC machine 220-A. The first five-phase AC machine 220-A also includes a first output link (a1) 222 that outputs a first output voltage, a second output link (b1) 224 that outputs a second output voltage, a third output link (c1) 225 that outputs a third output voltage, a fourth output link (d1) 226 that outputs a fourth output voltage, and a fifth output link (e1) 227 that outputs a fifth output voltage. Each output link (a1 . . . e1) is coupled to a motor winding of the second five-phase AC machine 220-B so that the second five-phase AC machine 220-B is coupled to the first five-phase AC machine 220-A via the first output link (a1) 222, the second output link (b1) 224, the third output link (c1) 225, the fourth output link (d1) 226, and the fifth output link (e1) 227.

The second five-phase AC machine 220-B outputs its own output mechanical power based on voltage at output links 222 . . . 227. Links (a2 . . . e2) that are coupled together to form a star connection in machine 220-B. The second five-phase AC machine 220-B outputs a second shaft position output ($\theta$_r2) 121-B.

As in the third embodiment described with reference to FIG. 3B, the first control loop 304 includes a first torque-to-current mapping module 140-A, a summing junction 152-A, a summing junction 154-A, a first current controller module 170-A, and a first modulation index computation module 175-A, as illustrated in FIG. 4B. Likewise, as illustrated in FIG. 4C, the second control loop 305 includes a second torque-to-current mapping module 140-B, a summing junction 152-B, a summing junction 154-B, a second current controller module 170-B, and a second modulation index computation module 175-B. Each of these junctions and modules operates as described with reference to FIGS. 3B and 3C and for sake of brevity the description of their operation will not be described here again. Moreover, the voltage boost command control loop 306 operates in the same manner as in the third embodiment (FIG. 3D), and for sake of brevity, the operation of the voltage boost command control loop 306 will not be repeated here.

Some of the embodiments and implementations are described above in terms of functional and/or logical block components and various processing steps. However, it should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for controlling two alternating current (AC) machines, the system comprising:
   a five-phase PWM inverter module coupled to the two AC machines and being designed to generate sinusoidal voltages for the two AC machines;
   a DC input voltage source that provides a DC input voltage;
   a boost converter, coupled to the five-phase PWM inverter module and the DC input voltage source, and being designed to supply a new DC input voltage to the five-phase PWM inverter module having a value that is greater than or equal to a value of the DC input voltage; and
   a voltage boost command control module designed to generate a boost command signal that controls the boost converter such that the boost converter generates the new DC input voltage in response to the boost command signal, wherein the boost command signal drives the new DC input voltage generated by the boost converter to a value greater than the DC input voltage when the two AC machines require additional voltage that exceeds the DC input voltage required to meet a combined target mechanical power required by the two AC machines.

2. A system according to claim 1, wherein the voltage boost command control module is further designed to:
output the voltage boost command signal with a positive value to the boost converter when the two AC machines require additional voltage that exceeds the DC input voltage, and output the voltage boost command signal with a zero value to the boost converter when the voltage required by the two AC machines is less than or equal to the DC input voltage, and
wherein the five-phase PWM inverter module generates, based on the new DC input voltage, sinusoidal voltage waveforms that drive the two AC machines at varying speeds.

3. A system according to claim 1, further comprising:
a first control loop designed to map a first torque command signal, a first speed ($\omega1$) of a shaft, and the new DC input voltage to a first d-axis current command signal and a first q-axis current command signal;
a second control loop designed to map a second torque command signal, a second speed ($\omega2$) of the shaft, and the new DC input voltage to a second d-axis current command signal and a second q-axis current command signal;
wherein the voltage boost command control module is further designed to receive a modulation index reference signal, a first modulation index from the first control loop and a second modulation index from the second control loop, and add the first modulation index to the second modulation index to generate a modulation index feedback signal input; and subtract the modulation index reference signal input from the modulation index feedback signal input to generate a modulation index error signal.

4. A system according to claim 3, wherein the voltage boost command control module is designed to operate in conjunction with the first control loop and the second control loop and further comprises:
a voltage command controller, comprising:
a voltage controller designed to: receive the modulation index error signal; and generate a first output command signal based on the modulation index error signal;
a positive limiter module designed to: receive the first output command signal, and limit the first output command signal between zero and a positive value, wherein the positive limiter module outputs the boost command signal to the boost converter, wherein the boost command signal controls the boost converter such that the boost converter supplies a voltage greater than the DC input voltage to the five-phase PWM inverter module when the two AC machines require additional voltage that exceeds the DC input voltage, and wherein the boost command signal outputs a zero value to the boost converter when the first output command signal is less than or equal to zero so that the boost converter supplies the DC input voltage to the five-phase PWM inverter module when the voltage required by the two AC machines is less than or equal to the DC input voltage.

5. A system according to claim 3, wherein the two AC machines comprise: a first three-phase AC machine and a second three-phase AC machine, and wherein the first control loop comprises:
a first torque-to-current mapping module designed to: receive the first torque command signal, the first speed ($\omega1$) of the shaft, and the new DC input voltage, and to map the first torque command signal, the first speed ($\omega1$) of the shaft, and new DC input voltage to the first d-axis current command signal and the first q-axis current command signal;
a first stationary-to-synchronous conversion module designed to: receive a first resultant stator current, a second resultant stator current, a third resultant stator current that are measured phase currents from the first three-phase AC machine and the first shaft position output ($\theta\_r1$); and generate a first feedback d-axis current signal and a first feedback q-axis current signal based on the first resultant stator current, the second resultant stator current, the third resultant stator current and the first shaft position output ($\theta\_r1$);
a first summing junction designed to: receive the first d-axis current command signal and the first feedback d-axis current signal; and subtract the first feedback d-axis current signal from the first d-axis current command signal to generate a first error d-axis current signal; and
a second summing junction designed to: receive the first q-axis current command signal and a first feedback q-axis current signal; and subtract the first feedback q-axis current signal from the first q-axis current command signal to generate a first error q-axis current signal.

6. A system according to claim 5, wherein the first control loop further comprises:
a first current controller module designed to: receive the first error d-axis current signal and the first error q-axis current signal; and generate a first d-axis voltage command signal and a first q-axis voltage command signal;
a first modulation index computation module designed to: receive the first d-axis voltage command signal and the first q-axis voltage command signal; and generate the first modulation index; and
a first synchronous-to-stationary conversion module designed to: receive the first d-axis voltage command signal, the first q-axis voltage command signal and the first shaft position output ($\theta\_r1$); and generate a first sinusoidal voltage command, a second sinusoidal voltage command, a third sinusoidal voltage command.

7. A system according to claim 6 wherein the second control loop further comprises:
a second torque-to-current mapping module designed to: receive a second torque command signal, a second speed ($\omega2$) of the shaft, and the new DC input voltage; and map the second torque command signal, the second speed ($\omega2$) of the shaft, and the new DC input voltage to a second d-axis current command signal and a second q-axis current command signal;
a second stationary-to-synchronous conversion module designed to: receive a fourth resultant stator current, a fifth resultant stator current and a sixth resultant stator current that are measured phase currents from the second three-phase AC machine and a second shaft position output ($\theta\_r2$); and generate a second feedback d-axis current signal and a second feedback q-axis current signal based on the fourth resultant stator current, the fifth resultant stator current, the sixth resultant stator current that are measured phase currents from the second three-phase AC machine and the second shaft position output ($\theta\_r2$);
a third summing junction designed to: receive the second d-axis current command signal and the second feedback d-axis current signal; and subtract the second feedback d-axis current signal from the second d-axis current command signal to generate a second error d-axis current signal; and a fourth summing junction designed to: receive the second q-axis current command signal and the second feedback q-axis current signal; and subtract the second feedback q-axis current signal from the second q-axis current command signal to generate a second error q-axis current signal.

8. A system according to claim 7, wherein the second control loop further comprises:
   a second current controller module designed to: receive the second error d-axis current signal and the second error q-axis current signal; and generate a second d-axis voltage command signal and a second q-axis voltage command signal;
   a second modulation index computation module designed to: receive the second d-axis voltage command signal and the second q-axis voltage command signal; and generate a second modulation index; and
   a second synchronous-to-stationary conversion module designed to: receive the second d-axis voltage command signal and the second q-axis voltage command signal; and generate a fourth sinusoidal voltage command, a fifth sinusoidal voltage command and a sixth sinusoidal voltage command.

9. A system according to claim 1, the system further comprising:
   a Space Vector (SV) PWM module, coupled to the first control loop and the second control loop and designed to receive the first sinusoidal voltage command, the second sinusoidal voltage command, the third sinusoidal voltage command, the fourth sinusoidal voltage command, the fifth sinusoidal voltage command, and the sixth sinusoidal voltage command; and generate a first switching vector signal, a second switching vector signal, a third switching vector signal, a fourth switching vector signal, and a fifth switching vector signal;
   wherein the five-phase PWM inverter module is coupled to the SVPWM module and designed to receive the first switching vector signal, the second switching vector signal, the third switching vector signal, the fourth switching vector signal, and the fifth switching vector signal, and further comprises: a first inverter pole that outputs a first sinusoidal voltage, a second inverter pole that outputs a second sinusoidal voltage, a third inverter pole that outputs a third sinusoidal voltage, a fourth inverter pole that outputs a fourth sinusoidal voltage, and a fifth inverter pole that outputs a fifth sinusoidal voltage;
   wherein the first three-phase AC machine is coupled to the five-phase PWM inverter module via the first inverter pole, the second inverter pole and the third inverter pole and designed to generate first mechanical power based on the first sinusoidal voltage, the second sinusoidal voltage and the third sinusoidal voltage, and the first shaft position output ($\theta\_r1$);
   wherein the second three-phase AC machine coupled to the five-phase PWM inverter module via the third inverter pole, the fourth inverter pole and the fifth inverter pole, and designed to generate second mechanical power based on the third sinusoidal voltage, the fourth sinusoidal voltage and the fifth sinusoidal voltage and the second shaft position output ($\theta\_r2$); and
   a first shaft coupled to and driven by the first mechanical power output by the first three-phase AC machine and a second shaft by the second mechanical power output by the second three-phase AC machine.

10. A system according to claim 3, further comprising:
    a stationary-to-synchronous conversion module designed to: receive a first resultant stator current, a second resultant stator current, a third resultant stator current, a fourth resultant stator current, a fifth resultant stator current, a first shaft position output, and a second shaft position output, and designed to generate a first feedback d-axis current signal, a first feedback q-axis current signal, a second feedback d-axis current signal and a second feedback q-axis current signal; and
    a synchronous-to-stationary conversion module designed to: receive a first d-axis voltage command signal, a first q-axis voltage command signal, a second d-axis voltage command signal and a second q-axis voltage command signal, the first shaft position output, and the second shaft position output; and generate a first sinusoidal voltage command, a second sinusoidal voltage command, a third sinusoidal voltage command, a fourth sinusoidal voltage command, and a fifth sinusoidal voltage command.

11. A system according to claim 10, wherein the two AC machines comprise: a first five-phase AC machine coupled to a second five-phase AC machine, and wherein the first control loop comprises:
    a first torque-to-current mapping module designed to: receive the first torque command signal, the first speed ($\omega 1$) of the shaft, and the new DC input voltage, and to map the first torque command signal, the first speed ($\omega 1$) of the shaft, and the new DC input voltage to the first d-axis current command signal and the first q-axis current command signal;
    a first summing junction designed to: receive the first d-axis current command signal and the first feedback d-axis current signal; and subtract the first feedback d-axis current signal from the first d-axis current command signal to generate a first error d-axis current signal; and
    a second summing junction designed to: receive the first q-axis current command signal and the first feedback q-axis current signal; and subtract the first feedback q-axis current signal from the first q-axis current command signal to generate a first error q-axis current signal.

12. A system according to claim 11, wherein the first control loop further comprises:
    a first current controller module designed to: receive the first error d-axis current signal and the first error q-axis current signal; and generate a first d-axis voltage command signal and a first q-axis voltage command signal; and
    a first modulation index computation module designed to: receive the first d-axis voltage command signal and the first q-axis voltage command signal; and generate the first modulation index.

13. A system according to claim 12, wherein the second control loop further comprises:
    a second torque-to-current mapping module designed to: receive a second torque command signal, a second speed ($\omega 2$) of the shaft, and the new DC input voltage; and map the second torque command signal, the second speed ($\omega 2$) of the shaft, and the new DC input voltage to a second d-axis current command signal and a second q-axis current command signal;
    a third summing junction designed to: receive the second d-axis current command signal and the second feedback d-axis current signal; and subtract the second feedback d-axis current signal from the second d-axis current command signal to generate a second error d-axis current signal; and a fourth summing junction designed to: receive the second q-axis current command signal and the second feedback q-axis current signal; and subtract the second feedback q-axis current signal from the second q-axis current command signal to generate a second error q-axis current command signal.

14. A system according to claim 13, wherein the second control loop further comprises:

a second current controller module designed to: receive the second error d-axis current signal and the second error q-axis current signal; and generate a second d-axis voltage command signal and a second q-axis voltage command signal; and a second modulation index computation module designed to: receive the second d-axis voltage command signal and the second q-axis voltage command signal; and generate a second modulation index.

15. A system according to claim 14, the system further comprising:

a Space Vector (SV) PWM module, coupled to the first control loop, the second control loop via the synchronous-to-stationary conversion module, and the five-phase PWM inverter module, the SVPWM module being designed to receive the first sinusoidal voltage command, the second sinusoidal voltage command, the third sinusoidal voltage command, the fourth sinusoidal voltage command, and the fifth sinusoidal voltage command; and generate a first switching vector signal, a second switching vector signal, a third switching vector signal, a fourth switching vector signal, and a fifth switching vector signal;

wherein the five-phase PWM inverter module is coupled to the SVPWM module and designed to receive the first switching vector signal, the second switching vector signal, the third switching vector signal, the fourth switching vector signal, and the fifth switching vector signal, wherein the five-phase PWM inverter module comprises: a first inverter pole that outputs a first sinusoidal voltage, a second inverter pole that outputs a second sinusoidal voltage, a third inverter pole that outputs a third sinusoidal voltage, a fourth inverter pole that outputs a fourth sinusoidal voltage, and a fifth inverter pole that outputs a fifth sinusoidal voltage;

wherein the first five-phase AC machine is coupled to the five-phase PWM inverter module via the first inverter pole, the second inverter pole and the third inverter pole, the fourth inverter pole and the fifth inverter pole, and is designed to generate first through fifth machine voltages and to generate mechanical power based on first to fifth machine voltage; and a first shaft coupled to and driven by the mechanical power output by the first five-phase AC machine, wherein the second five-phase AC machine coupled in series to the first five-phase AC machine, and is designed to generate mechanical power based on the first through fifth machine voltages; and a second shaft coupled to and driven by the mechanical power output by the second five-phase AC machine.

16. A system, comprising:

two alternating current (AC) machines that require a combined target mechanical power that varies during operation;

a five-phase PWM inverter module coupled to the two AC machines and being designed to generate sinusoidal voltage waveforms for the two AC machines at varying speeds;

a DC input voltage source that provides a DC input voltage;

a boost converter, coupled to the five-phase PWM inverter module and the DC input voltage source, and being designed to supply a new DC input voltage to the five-phase PWM inverter module having a value that is greater than or equal to a value of the DC input voltage, wherein the five-phase PWM inverter module generates the sinusoidal voltage waveforms that drive the two AC machines based on the new DC input voltage; and a voltage boost command control module designed to generate a boost command signal that controls the boost converter.

17. A system according to claim 16, wherein the boost command signal generated by the voltage boost command control module controls the boost converter such that the boost converter generates the new DC input voltage in response to the boost command signal.

18. A system according to claim 17, wherein the boost command signal drives the new DC input voltage generated by the boost converter to a value greater than the DC input voltage when the two AC machines require additional voltage that exceeds the DC input voltage required to meet the combined target mechanical power required by the two AC machines.

19. A system according to claim 18, wherein the voltage boost command control module is further designed to:

output the voltage boost command signal with a positive value to the boost converter when the two AC machines require additional voltage that exceeds the DC input voltage, and output the voltage boost command signal with a zero value to the boost converter when the voltage required by the two AC machines is less than or equal to the DC input voltage.

20. A system according to claim 16, further comprising:

a first control loop; and a second control loop, wherein the voltage boost command control module is designed to operate in conjunction with the first control loop and the second control loop, and wherein the voltage boost command control module is further designed to receive a modulation index reference signal, a first modulation index from the first control loop and a second modulation index from the second control loop, and add the first modulation index to the second modulation index to generate a modulation index feedback signal input; and subtract the modulation index reference signal input from the modulation index feedback signal input to generate a modulation index error signal, wherein the voltage boost command control module further comprises:

a voltage command controller, comprising:

a voltage controller designed to: receive the modulation index error signal; and generate a first output command signal based on the modulation index error signal;

a positive limiter module designed to: receive the first output command signal, and limit the first output command signal between zero and a positive value, wherein the positive limiter module outputs the boost command signal to the boost converter, wherein the boost command signal controls the boost converter such that the boost converter supplies a voltage greater than the DC input voltage to the five-phase PWM inverter module when the two AC machines require additional voltage that exceeds the DC input voltage, and wherein the boost command signal outputs a zero value to the boost converter when the first output command signal is less than or equal to zero so that the boost converter supplies the DC input voltage to the five-phase PWM inverter module when the voltage required by the two AC machines is less than or equal to the DC input voltage.

* * * * *